US008381111B2

(12) United States Patent
Kawana

(10) Patent No.: US 8,381,111 B2
(45) Date of Patent: Feb. 19, 2013

(54) MANAGEMENT APPARATUS, IMAGE FORMING APPARATUS, AND SERVICE PROCESSING METHOD

(75) Inventor: Yoshimasa Kawana, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 507 days.

(21) Appl. No.: 12/574,306

(22) Filed: Oct. 6, 2009

(65) Prior Publication Data
US 2010/0088609 A1    Apr. 8, 2010

(30) Foreign Application Priority Data

Oct. 8, 2008  (JP) ................................ 2008-261336

(51) Int. Cl.
*G06F 3/00*    (2006.01)
(52) U.S. Cl. .................. 715/740; 399/8; 399/9; 399/11; 399/81; 358/305; 355/133; 101/494; 715/700
(58) Field of Classification Search .................. 715/740; 399/8, 9, 11
See application file for complete search history.

(56) References Cited

U.S. PATENT DOCUMENTS

| 7,319,825 | B2* | 1/2008 | Motohashi | 399/8 |
| 7,738,808 | B2* | 6/2010 | Lovat et al. | 399/79 |
| 8,150,819 | B2* | 4/2012 | Takahashi | 707/705 |
| 2003/0063313 | A1* | 4/2003 | Ito | 358/1.15 |
| 2003/0117642 | A1* | 6/2003 | Haraguchi | 358/1.15 |
| 2004/0153530 | A1* | 8/2004 | Machida | 709/220 |
| 2005/0100358 | A1* | 5/2005 | Ushio et al. | 399/82 |
| 2005/0265744 | A1* | 12/2005 | Uruta | 399/80 |
| 2006/0101078 | A1* | 5/2006 | Tashiro et al. | 707/104.1 |
| 2006/0110171 | A1* | 5/2006 | Miyazawa et al. | 399/8 |
| 2006/0126110 | A1* | 6/2006 | Ohara et al. | 358/1.15 |
| 2006/0176509 | A1* | 8/2006 | Aoki et al. | 358/1.15 |
| 2006/0290680 | A1* | 12/2006 | Tanaka et al. | 345/173 |
| 2007/0067681 | A1 | 3/2007 | Hikawa | |
| 2007/0247467 | A1* | 10/2007 | Kaneda | 345/531 |
| 2008/0141167 | A1* | 6/2008 | Kubo et al. | 715/796 |

FOREIGN PATENT DOCUMENTS

| JP | 2002-229889 A | 8/2002 |
| JP | 2006-135697 A | 5/2006 |
| JP | 2007-116671 | 5/2007 |
| JP | 2008-042706 A | 2/2008 |

* cited by examiner

*Primary Examiner* — Robert Stevens
*Assistant Examiner* — Patrick Riegler
(74) *Attorney, Agent, or Firm* — Canon USA, Inc., IP Division

(57) ABSTRACT

According to an instruction by a manager, information about the image forming apparatus to be monitored is set with the management server. A communication test is conducted between the management server and the image forming apparatus. The management server confirms an ID of the image forming apparatus. Subsequently, upon receiving a setting information request from the image forming apparatus, the management server responds with generated UI button information and access-destination information which can be extended by the UI button information to the image forming apparatus.

14 Claims, 18 Drawing Sheets

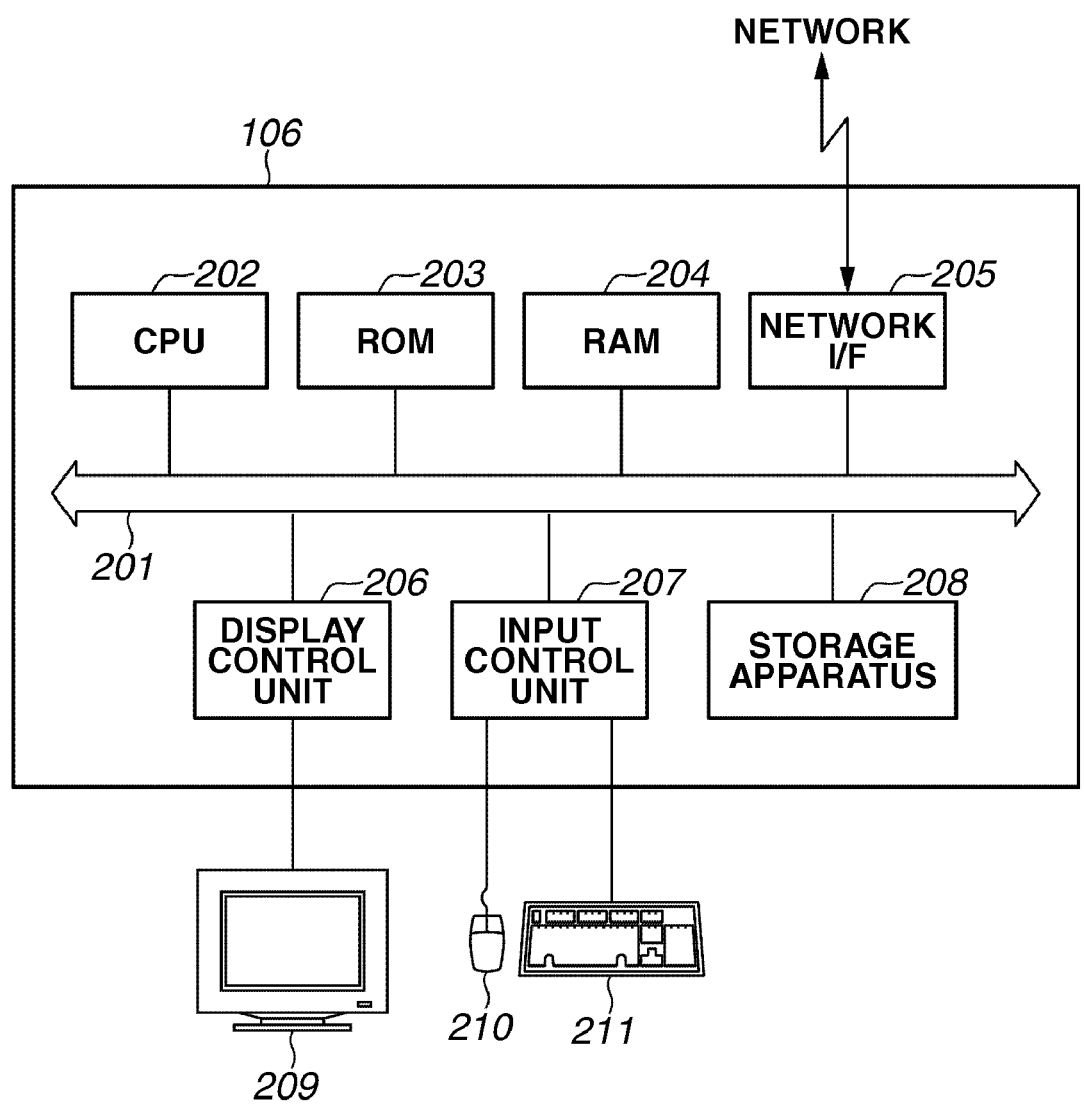

| | |
|---|---|
| SYSTEM BASIC PROGRAM OPERATING SYSTEM (OS) | 301 |
| MANAGEMENT PROGRAM | 302 |
| USER INTERFACE (UI) PROGRAM (REGISTRATION PROCESSING) | 303 |
| USER/IMAGE FORMING APPARATUS AUTHENTICATION PROGRAM | 304 |
| MESSAGE TRANSMISSION/RECEPTION PROGRAM | 305 |
| RECEPTION COMMAND ANALYSIS PROGRAM | 306 |
| MENU CONFIGURATION PROGRAM FOR CONTROLLING UI | 307 |
| EACH PROCESSING PROGRAM | 308 |
|    REQUEST TRANSMISSION PROCESSING PROGRAM | 309 |
|    PROCESSING PROGRAM FOR TRANSMITTING SCHEDULE SETTING INFORMATION | 310 |
|    PROCESSING PROGRAM FOR RECEIVING STATUS | 311 |
|    . . . | |
| SERVICE INFORMATION DATABASE (DB) OF MANAGEMENT SERVER | 312 |
|    TABLE FOR MANAGING BASIC INFORMATION | 313 |
|    TABLE FOR MANAGING COUNTER INFORMATION | 314 |
|    TABLE FOR MANAGING EVENT INFORMATION | 315 |
|    TABLE FOR MANAGING TONER STOCK INFORMATION | 316 |
|    TABLE FOR MANAGING PART'S LIFE INFORMATION | 317 |
|    . . . | |
| MASTER DATA DATABASE OF IMAGE FORMING APPARATUS TO BE MONITORED | 318 |
|    IDENTIFICATION INFORMATION | 319 |
|    TYPE INFORMATION | 320 |
|    UI BUTTON INFORMATION | 321 |
|    UI ACCESS-DESTINATION ADDRESS INFORMATION | 322 |
|    . . . | |

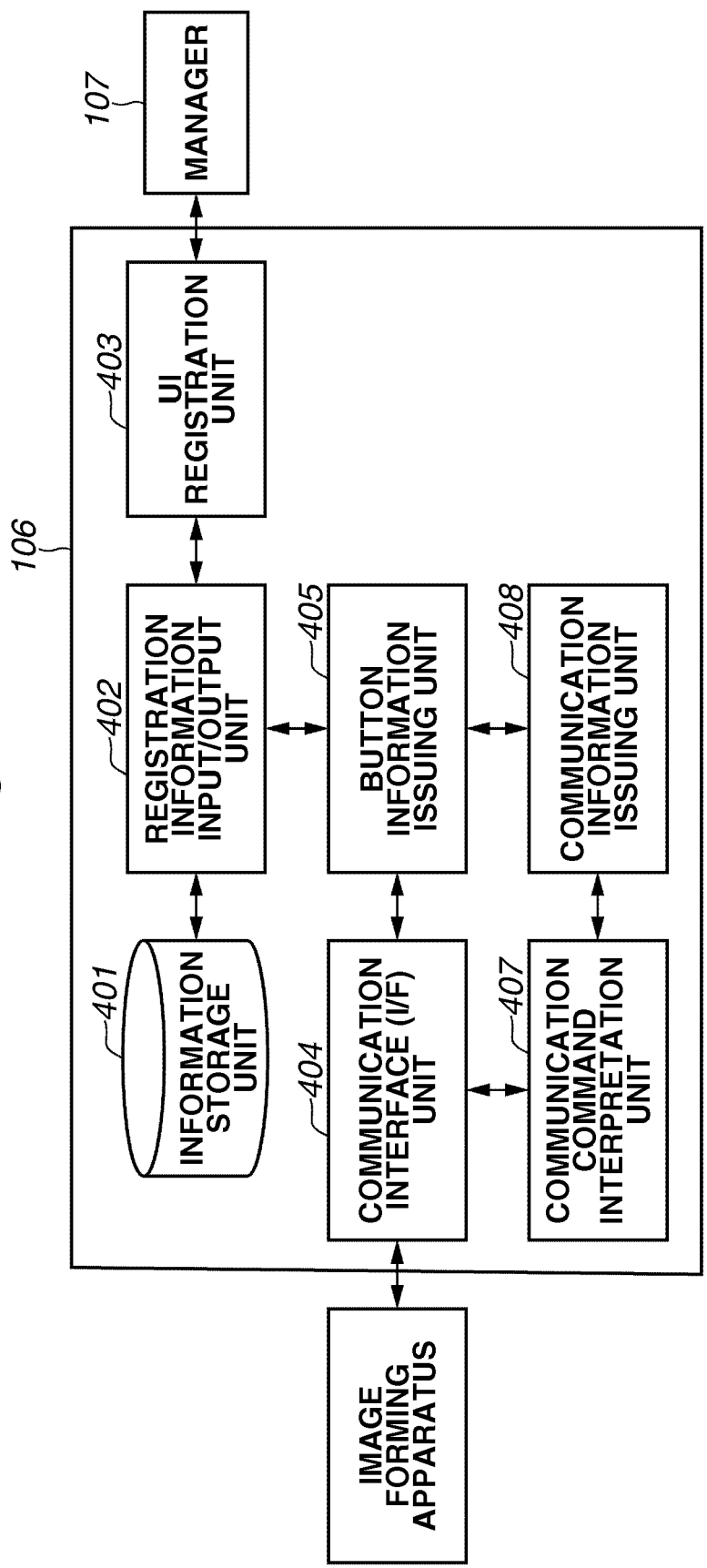

| | |
|---|---|
| SYSTEM BASIC PROGRAM OPERATING SYSTEM (OS) | 601 |
| MANAGEMENT PROGRAM | 602 |
| MESSAGE TRANSMISSION/RECEPTION PROGRAM | 603 |
| RECEPTION COMMAND ANALYSIS PROGRAM | 604 |
| ANALYSIS PROGRAM | 605 |
| EACH PROCESSING PROGRAM | 606 |
|     PROCESSING PROGRAM FOR TRANSMITTING EVENT INFORMATION | 607 |
|     PROCESSING PROGRAM FOR TRANSMITTING SCHEDULE INFORMATION | 608 |
|     PROCESSING PROGRAM FOR TRANSMITTING COUNTER INFORMATION | 609 |
|     PROCESSING PROGRAM FOR CHANGING SCHEDULE SETTING | 610 |
|     . . . | |
| UI SETTING CHANGING PROGRAM | 611 |
| . . . | |
| STATUS DB | 612 |
|     BASIC INFORMATION | 613 |
|     ERROR INFORMATION | 614 |
|     ALARM INFORMATION | 615 |
|     CHARGING COUNTER INFORMATION | 616 |
|     FUNCTION COUNTER INFORMATION | 617 |
|     . . . | |
| UI SETTING INFORMATION DB | 618 |
|     BUTTON INFORMATION | 619 |
|     ACCESS-DESTINATION ADDRESS | 620 |
|     . . . | |
| PROGRAM LOADING REGION | 621 |

FIG.10

MANAGEMENT SERVER COMMUNICATION DATA SAMPLE 1 — S811

| | | |
|---|---|---|
| RESPONSE TO SETTING INFORMATION REQUEST | | ~1001 |
| | COMMAND INFORMATION | ~1002 |
| | | COMMUNICATION RESULT — 1003 |
| | | DATE AND TIME WHEN PROCESSING IS COMPLETED — 1004 |
| | | DETAILED DESCRIPTION WHEN COMMUNICATION ERROR OCCURS — 1005 |
| | | . . . |
| | SETTING OF UI BUTTON INFORMATION | ~1006 |
| | | ID: 1 — 1007 |
| | | TITLE: COUNTER HISTORY INFORMATION — 1008 |
| | | ACCESS-DESTINATION ADDRESS: HTTP://MANAGEMENT SERVER — 1009 |
| | | . . . |
| | | ID: 2 — 1010 |
| | | TITLE: EVENT HISTORY INFORMATION — 1011 |
| | | ACCESS-DESTINATION ADDRESS: HTTP://MANAGEMENT SERVER — 1012 |
| | | . . . |
| | | ID: 3 — 1013 |
| | | TITLE: TONER STOCK INFORMATION — 1014 |
| | | ACCESS-DESTINATION ADDRESS: HTTP://MANAGEMENT SERVER — 1015 |
| | | . . . |

MANAGEMENT SERVER COMMUNICATION SAMPLE 2 — S851

| | | |
|---|---|---|
| RESPONSE TO SETTING INFORMATION REQUEST | | ~1001 |
| | COMMAND INFORMATION | ~1002 |
| | | COMMUNICATION RESULT — 1003 |
| | | DATE AND TIME WHEN PROCESSING IS COMPLETED — 1004 |
| | | DETAILED DESCRIPTION WHEN COMMUNICATION ERROR OCCURS — 1005 |
| | | . . . |
| | LIST OF AVAILABLE SERVICES | ~1051 |
| | | ID: 1 — 1052 |
| | | SERVICE: COUNTER HISTORY INFORMATION — 1053 |
| | | ID: 2 — 1054 |
| | | SERVICE: EVENT HISTORY INFORMATION — 1055 |
| | | ID: 3 — 1056 |
| | | SERVICE: TONER STOCK INFORMATION — 1057 |
| | | ID: 4 — 1058 |
| | | SERVICE: PART LIFETIME INFORMATION — 1059 |
| | | . . . |

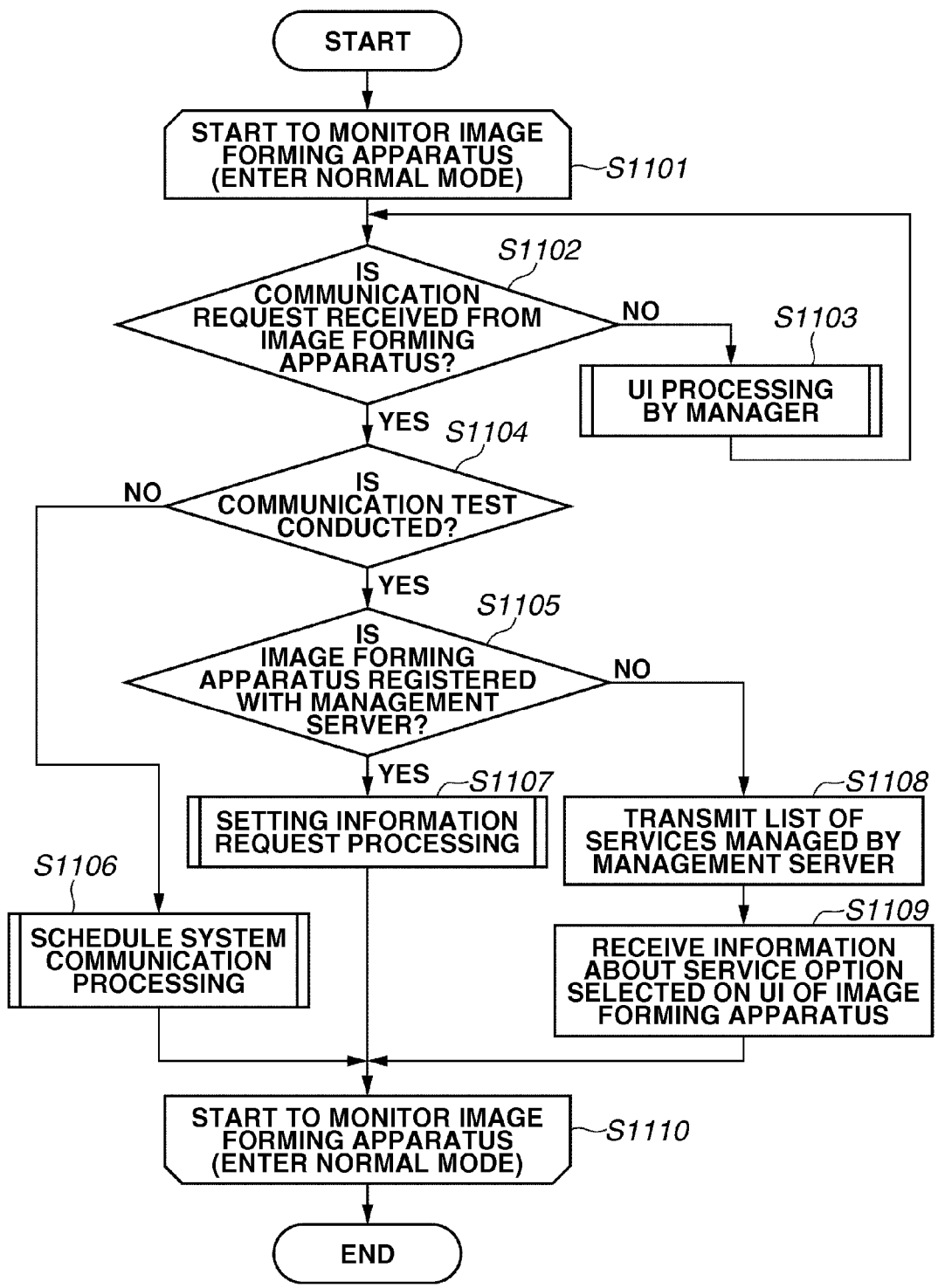

FIG.17

| NO | MODE | TITLE | SOURCE |
|----|------|-------|--------|
| 1 | SERVICE | COUNTER HISTORY INFORMATION | https://maint.net/main?devID=xxx&type=count&mode=service |
| 2 | SERVICE | EVENT HISTORY INFORMATION | https://maint.net/main?devID=xxx&type=evet&mode=service |
| 3 | SERVICE | TONER STOCK INFORMATION | https://maint.net/main?devID=xxx&type=tonert&mode=service |
| 4 | USER | COUNTER HISTORY INFORMATION | https://maint.net/main?devID=xxx&type=count&mode=user |
| 5 | USER | EVENT HISTORY INFORMATION | https://maint.net/main?devID=xxx&type=evet&mode=user |
| 6 | USER | TONER STOCK INFORMATION | https://maint.net/main?devID=xxx&type=tonert&mode=user |

FIG.18

| | |
|---|---|
| DEVICE ID | AAA12345 |
| MONITOR | VGA |
| AVAILABLE MODE | USER, SERVICE |
| AVAILABLE FUNCTION | HTML, PDF |

MANAGEMENT APPARATUS, IMAGE FORMING APPARATUS, AND SERVICE PROCESSING METHOD

BACKGROUND OF THE INVENTION

1. Field of the Invention

The present invention relates to a technique for managing image forming apparatuses such as a printer, a copy machine and a multi-function machine using a network communication, and more particularly to control when processing results performed by a management server that remotely manages the image forming apparatus via a network are referred from the image forming apparatus.

2. Description of the Related Art

A conventional maintenance system has been known in which a management server is placed on the Internet to remotely and collectively manage a client's image forming apparatus via a network. The conventional maintenance system, for example, collects maintenance information such as a status of the image forming apparatus and a number of prints based on a monitoring program of the image forming apparatus to manage the image forming apparatus.

Further, Japanese Patent Application Laid-Open No. 2007-116671 discusses a conventional technique for displaying service maintenance information responding to error information issued by the image forming apparatus, on a user interface (UI) of the image forming apparatus. The service maintenance information which is acquired from the management server and responds to a specific trouble that occurs in the image forming apparatus is displayed on the UI of the image forming apparatus. With this technique, the maintenance of the image forming apparatus can be effectively improved.

Unlike Japanese Patent Application Laid-Open No. 2007-116671, even when the image forming apparatus does not get in trouble, it is desired that the maintenance information of the image forming apparatus managed by the management server can be freely acquired by the image forming apparatus.

The maintenance information of the image forming apparatus collected by the management server is conventionally provided to a Web site or a manager who manages the image forming apparatus in a report file form via a hyper text transfer protocol (HTTP).

A service company providing a maintenance service can monitor a status of the image forming apparatus, however, it has been difficult to acquire the information managed by the system from the UI of the image forming apparatus.

For example, in order to acquire the information managed by the management server based on an instruction from the UI of the image forming apparatus, a program needs to be mounted to directly acquire the maintenance information from the management server.

In such a case, for both of the management server and the image forming apparatus, function extension or firmware needs to be upgraded, resulting in increasing costs. Further, a method for mounting a browser in the image forming apparatus and browsing management information can be considered. However, since mounting of the browser depends on a specification of the image forming apparatus, the browser cannot be mounted in all image forming apparatuses.

Furthermore, in order to acquire the information managed by the management system of the image forming apparatus, it is necessary to perform various procedures, for example, entry of a uniform resource locator (URL), login authentication, and a search. Under limited circumstances such as a soft keyboard, which is a general interface of the image forming apparatus, such operations for performing the procedures are particularly difficult and thus acquiring the information is a troublesome work.

SUMMARY OF THE INVENTION

The present invention is directed to a technique for easily providing a user with information managed by a management server by extending a UI of an image forming apparatus without performing authentication or a search for the image forming apparatus.

According to an aspect of the present invention, a management apparatus which manages a plurality of image forming apparatuses via a network includes, a setting unit configured to, when information about the image forming apparatus to be monitored is registered with a database, set a service function to be provided to the image forming apparatus, a generation unit configured to generate access-destination information for acquiring information corresponding to the service function set by the setting unit and button information for selecting the service function, and a response unit configured to, when the information about the image forming apparatus is registered with the database as an object to be managed, respond with the access-destination information and the button information that are generated by the generation unit to the image forming apparatus in response to a request from the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating a configuration example of hardware of a management server illustrated in FIG. 1 according to the first exemplary embodiment of the present invention.

FIG. 3 illustrates an example of a configuration of programs and data that are developed in a read only memory (ROM) or a storage device illustrated in FIG. 2 according to the first exemplary embodiment of the present invention.

FIG. 4 is a block diagram illustrating functions of an application program which issues a setting for extending a UI button in the management server illustrated in FIG. 1 according to the first exemplary embodiment of the present invention.

FIG. 6 illustrates an example of a configuration of programs and data that are developed in a ROM or a storage device illustrated in FIG. 5 according to the first exemplary embodiment of the present invention.

FIG. 10 illustrates an example of a communication data sample transmitted from the management server to the image forming apparatus illustrated in FIG. 1 according to the first exemplary embodiment of the present invention.

FIG. 11 is a flowchart illustrating an example of data processing performed by the management server according to the first exemplary embodiment of the present invention.

FIG. 17 illustrates an example of UI button information transmitted by the management server to the image forming apparatus according to the second exemplary embodiment of the present invention.

FIG. 18 illustrates an example of transmission information received from the image forming apparatus illustrated in FIG. 1 according to the second exemplary embodiment of the present invention.

DESCRIPTION OF THE EMBODIMENTS

Various exemplary embodiments, features, and aspects of the invention will be described in detail below with reference to the drawings.

Figure 1:
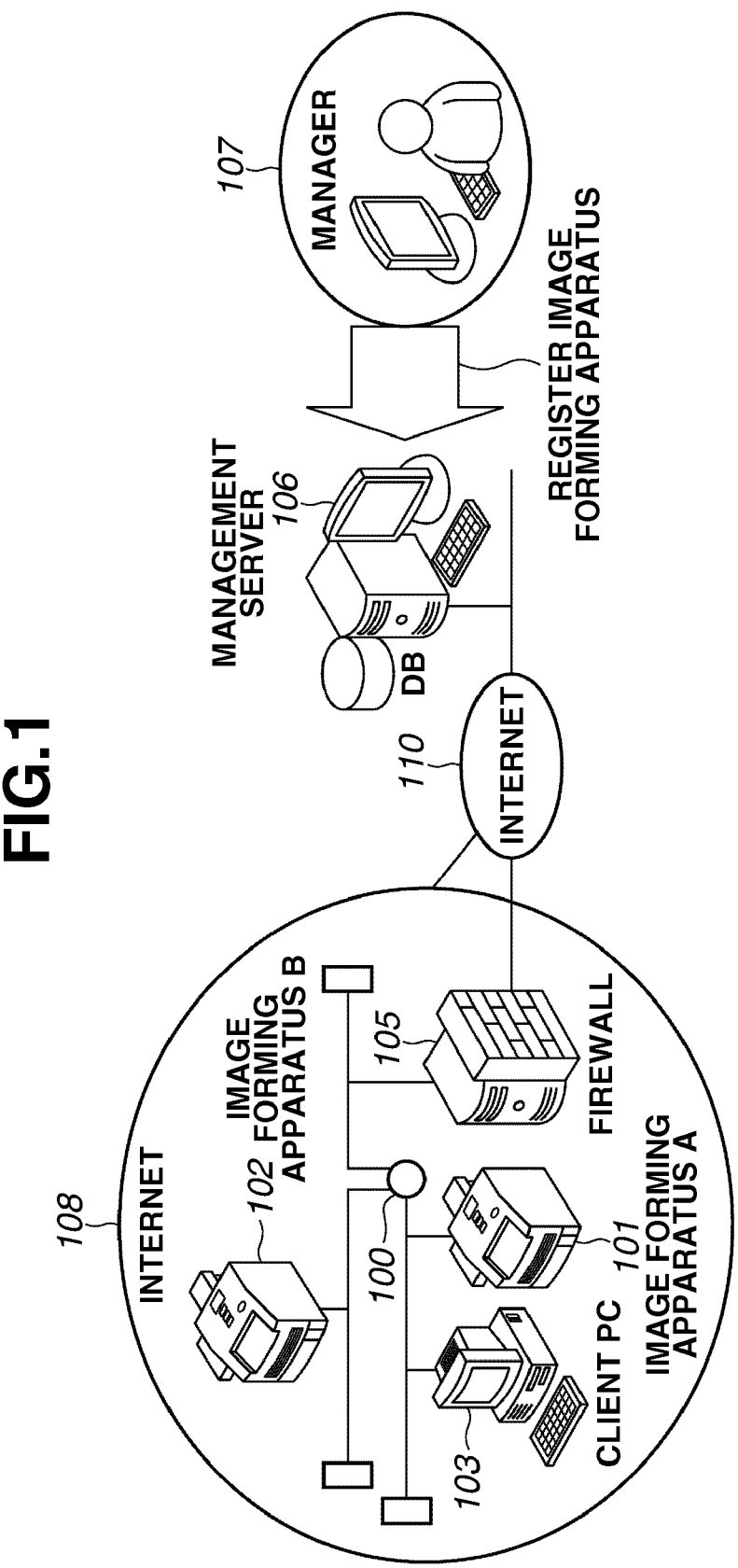
FIG. 1 illustrates a configuration of a management system including a management apparatus according to a first exemplary embodiment of the present invention.

FIG. 1 illustrates a configuration of a management system including a management apparatus according to a first exemplary embodiment of the present invention. The present exemplary embodiment describes processing in which a management server that functions as the management apparatus communicates with an image forming apparatus which is a monitoring target, via a network and extends information that can be displayed on a UI of a display apparatus included in the image forming apparatus.

The image forming apparatus includes a multi function printer (MFP), a single function printer (SFP), and a digital copy machine as described below.

FIG. 1 illustrates an intranet circumstance 100 of a client. Image forming apparatuses 101 and 102 include an MFP or an SFP connected to the intranet of the client.

According to a first exemplary embodiment, a storage device provided in each image forming apparatus includes a monitoring module. The monitoring module monitors a status of the image forming apparatus and communicates with an external management server.

The monitoring module includes software for acquiring information related to a service function managed by a management server 106.

Further, the monitoring module is a software program for monitoring the image forming apparatus. The monitoring module may be included in the image forming apparatus, a personal computer (PC) or a specified hardware.

A PC 103 is used by a general user for business. Within the intranet, a firewall 105, which is a connection point to an Internet 110, is provided.

A management server 106 is provided on the Internet 110 and communicates with the monitoring module provided in the image forming apparatus connected to the network of each client. Thus, the management server 106 collects information of a plurality of image forming apparatuses and manages the image forming apparatuses.

A manager 107 who monitors the image forming apparatus represents a user who accesses the management server 106 via the Internet 110 and registers the image forming apparatus to be monitored.

The management server 106 acquires information from the image forming apparatuses 101 and 102 according to a content of a service function set by the manager 107. According to the present exemplary embodiment, the information is related to the service functions of the image forming apparatuses 101 and 102.

For example, the service function managed by the management server 106 includes a service for acquiring a charging counter, a service for displaying a report, and a service for acquiring a trouble event such as an error and an alarm. Further, the service function includes a service for notifying an event, a service for collecting apart counter and calculating an attrition level of parts, and a service for managing a number of toner stocks.

The information of the image forming apparatus acquired and managed by the management server 106 includes an operation mode setting of the image forming apparatus, operation information such as a counter value, an operation log, and a counter value indicating a level of usage of each part, and trouble information about a trouble of hardware and a jam.

Furthermore, the management server 106 updates the setting information and sends commands such as re-booting to the monitoring module to control the monitoring module and the image forming apparatuses 101 and 102. As a communication unit for that purpose, a simple object access protocol (SOAP) via a protocol such as an HTTP and a HTTP Secure (HTTPS) is used.

Since the communication unit is used just for communication between the management server 106 and the image forming apparatuses 101 and 102, the protocol is not limited to the HTTP or the HTTPS.

According to an example of FIG. 1, the monitoring module acquires the information of the image forming apparatuses 101 and 102 to be monitored and transmits the acquired information to the management server 106 via a proxy server and a firewall 105 using the HTTPS.

The Internet 110 is connected to a large number of networks of other clients which is similar to an Internet 108.

FIG. 2 is a block diagram illustrating a configuration example of hardware of the management server 106 illustrated in FIG. 1. The present exemplary embodiment describes the management server 106 constituted by a versatile computer.

In FIG. 2, a central processing unit (CPU) 202 comprehensively controls devices connected to a system bus 201. A ROM 203 stores a booting program necessary for starting up the system. A random access memory (RAM) 204 is an operation memory necessary for the CPU 202 to execute the program.

A network I/F 205 performs communication in the network. A display control unit 206 performs control to display a content of communication with the monitoring module on a display device 209.

An operator that manages the management server 106 operates input devices 210 and 211. An input control unit 207 receives inputs from the input devices 210 and 211.

A storage device 208 stores the program to be executed by the CPU 202 and operation information of each image forming apparatus transmitted from the monitoring module. The storage device 208 includes a magnetic disk as a storage medium.

The management server 106 receives a notification of regular operation information, a notification of an irregular, abnormal status, and communication data such as a command request from the monitoring module in the image forming apparatus via the network I/F 205.

The management server 106 also receives the command input to change a setting or request an operation, from the user to the image forming apparatuses 101 and 102 via the input control unit 207 at any time.

The operation information regularly notified from the image forming apparatus includes various counter values or operation logs. The management server 106 calculates a regular maintenance fee which is monthly charged on the client who owns the image forming apparatus based on the operation information.

Further, the management server 106 outputs as the operation information a report about an attrition rate relative to a recommended lifetime of a part employed in the image forming apparatus. The management server 106 sequentially stores the operation information in the storage device 208. The operator of the management server 106 determines a charge on the client while appropriately referring to the operation information stored in the storage device 208.

In addition to the operation information, the irregularly-notified information indicating the abnormal status of the image forming apparatus includes error/alarm information about the hardware trouble and the jam.

Upon receiving the information from the image forming apparatuses 101 and 102, the management server 106 determines processing to be performed next based on a level of emergency of the information. For example, if the received information notifies the abnormal status of the image forming apparatus including a trouble which needs to be urgently addressed, the management server 106 performs the processing as described below.

According to a registered mail address, the management server 106 transmits an e-mail to the operator who manages the image forming apparatus that notifies the trouble which needs to be urgently addressed.

Further, the management server 106 sequentially stores the received information that notifies the abnormal status in the storage device 208 and displays the information on a display device 209 to notify the operator that the image forming apparatus is in the abnormal status.

On the other hand, when receiving from the image forming apparatus the information which notifies a low emergency level such as the jam or the alarm, the management server 106 determines whether the e-mail needs to be transmitted according to the status of the image forming apparatus.

Further, the management server 106 sequentially stores in the storage device 208 the information which has been received from the image forming apparatus and notifies the abnormal status, and determines whether the information needs to be displayed on the display device 209 according to the status of the image forming apparatus.

For example, if similar jams continuously occur in the same image forming apparatus, the management server 106 upgrades the emergency level, transmits the mail and displays the information when receiving the information about the jam from the image forming apparatus. The operator determines the status of the image forming apparatus from contents displayed on the display device 209 and gives a serviceman an instruction about an operation for recovering from the trouble as necessary.

The management server 106 always receives a command request from the monitoring module in the image forming apparatus at arbitrary timing. Every time the command request is received, the management server 106 checks the storage device 208. If the command to be transmitted to the monitoring module is set in the storage device 208, the management server 106 transmits the command to the monitoring module.

FIG. 3 illustrates an example of a configuration of programs and data that are developed in the ROM 203 or the storage device 208 illustrated in FIG. 2. In FIG. 3, only the programs and the data relating to the present exemplary embodiment are illustrated, and other programs and data are omitted.

In FIG. 3, a system program 301 performs basic control as an operating system (OS). A management program 302 controls the overall image forming apparatus.

A user interface (UI) program 303 controls input of identification information of the image forming apparatus, a type of a service to be provided, and other information for managing the image forming apparatus in order to register the image forming apparatus to be monitored by the user.

The UI program 303 stores master data input by the user in a predetermined database and generates the setting information for communicating with the monitoring module. The predetermined database is secured in the storage device 208 according to the present exemplary embodiment.

An authentication program 304 authenticates the user or the image forming apparatus to be managed. More specifically, the authentication program 304 authenticates the monitoring module which transmits status data of the image forming apparatus or the user who registers the image forming apparatus. A message transmission/reception program 305 controls transmission/reception of a message including a command between the management server and the monitoring module via the Internet.

The message described above means the data transmitted/received between the management server and the monitoring module, and includes a method for specifying a type for processing the data, and the status data of the image forming apparatus.

Further, the message can be transmitted from/to the monitoring module in the image forming apparatus to/from the management server 106.

An analysis program 306 for analyzing a received command analyzes a command included in the message received from the monitoring module and issues instructions to perform the processing according to the command.

A menu configuration program 307 which constitutes a UI control menu generates setting information necessary for extending a button on the UI of the image forming apparatus that is registered and managed by the user using the UI program 303.

The UI program 303 determines the data that is necessary for providing maintenance service information and needs to be acquired from the image forming apparatus, based on the registered image forming apparatus and the selected service information.

Further, the UI program 303 determines management information of the image forming apparatus, which is the access-destination information used by the manager 107 to refer to the maintenance information.

When the management information is determined as described above, the menu configuration program 307 generates the access-destination information to acquire a service title and information in order to directly acquire the management information from the UI of the image forming apparatus.

A processing program 308 is executed according to an analysis result of the analysis program 306. The processing program 308 includes a request transmission processing program 309 for transmitting a request, a processing program 310 for transmitting schedule setting information, and a processing program 311 for receiving a status.

If the analysis program 306 analyzes the received command as a command request, the request transmission processing program 309 is executed. If the analysis program 306 analyzes the received command as the setting information, the processing program 310 for transmitting the schedule setting information is executed.

Similarly, if the analysis program 306 analyzes and determines the received command as the status reception by the image forming apparatus, the processing program 311 for receiving the status is executed. In the example, the received command according to the present exemplary embodiment is described. However, the received command is not limited to the present exemplary embodiment.

A service information database 312 manages the service information and stores management tables 313, 314, 315, 316, and 317 that are necessary for service functions provided to the manager.

The service functions according to the present exemplary embodiment include a service function for acquiring counter history information about the image forming apparatus, a service function for acquiring event history information about the image forming apparatus, and a service function for acquiring stock information about consumable products of the image forming apparatus.

Figure 8:
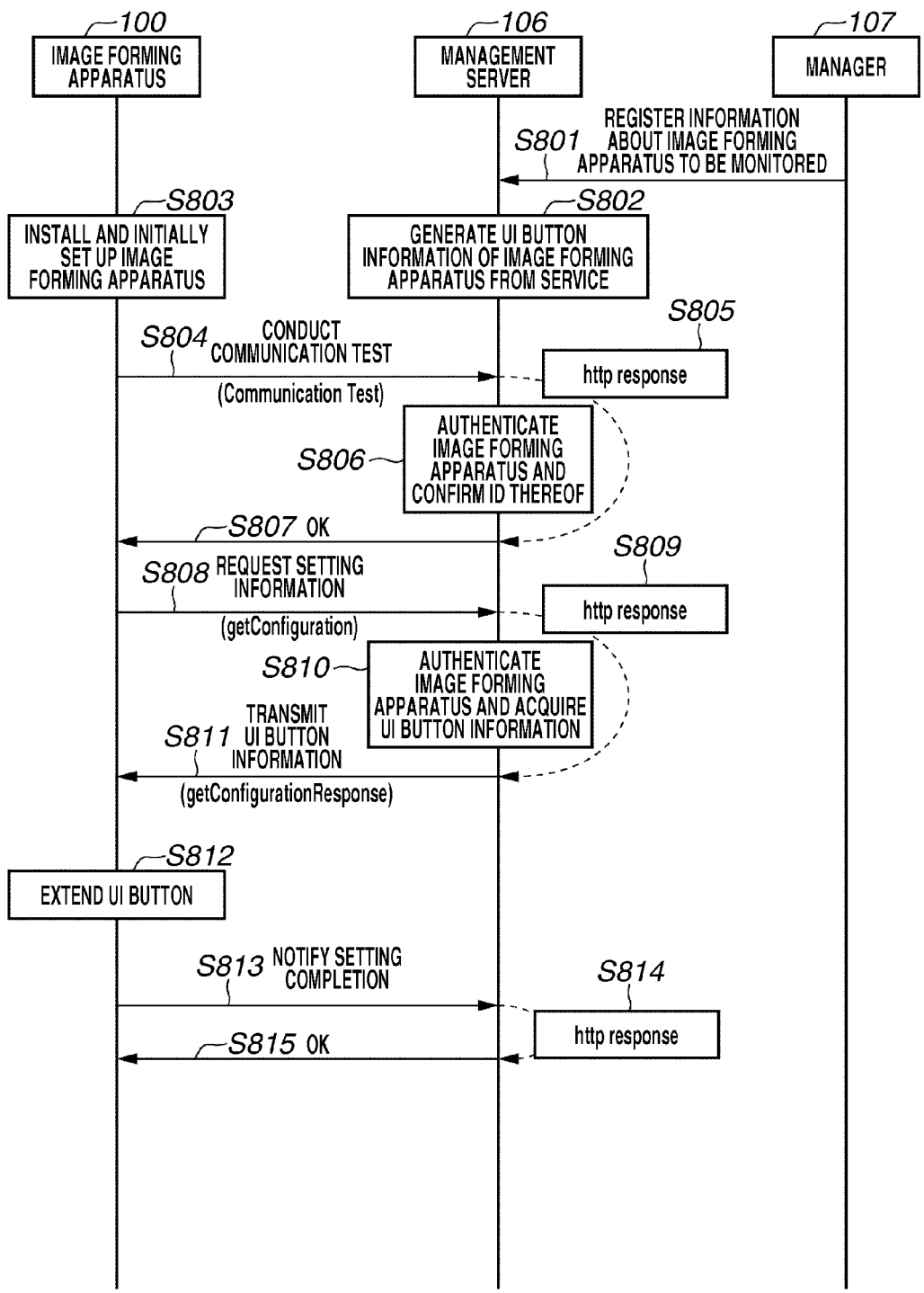
FIG. 8 illustrates a communication sequence performed by a management system according to the first exemplary embodiment of the present invention.

Further, the service functions include a service function for acquiring history information about replacement of a replaceable part of the image forming apparatus. A combination of the service information is set by the manager 107 as illustrated in FIG. 8.

A management table 313 manages product information of the image forming apparatus, which is basic information. A management table 314 manages counter information of the image forming apparatus. A management table 315 manages event information including an error of the image forming apparatus.

A management table 316 manages and associates toner events with a number of toner stocks stored by a client for management. A management table 317 manages lifetime information of parts that indicates how long each part employed in the image forming apparatus has been used.

A management table 318 manages the master data of the image forming apparatus to be monitored and stores various types of information 319, 320, 321, and 322 that constitute the master data.

The information 319 is identification information for identifying the image forming apparatus. The information 320 is model information of the image forming apparatus to be monitored. The information 321 is UI button information, which is setting information when the button is extended on the UI of each image forming apparatus.

The address information 322 of the access destination indicates one example of the access-destination information used when the UI of the image forming apparatus causes the management server to acquire the information.

FIG. 4 is a block diagram illustrating functions of an application program which issues a setting for extending the button on the UI of the image forming apparatus in the management server 106 illustrated in FIG. 1. The functions of the application will be described below.

In FIG. 4, a UI registration unit 403 receives registration of the image forming apparatus from the user. The manager 107 inputs an identifier and product information of the image forming apparatus and selects a service provided to each image forming apparatus.

A registration information input/output unit 402 registers the information of the image forming apparatus with a information storage unit 401 and reads out the registered information of the image forming apparatus from the information storage unit 401.

A button information issuing unit 405 generates button information about the UI of the image forming apparatus from the service information associated with the image forming apparatus. The information storage unit 401 stores the button information issued by the button information issuing unit 405.

A communication I/F unit 404 communicates with the monitoring module. A communication command interpretation unit 407 extracts an identification (ID) and a communication command from the data received from the monitoring module.

The communication command interpretation unit 407 has a function for forming the data to be transmitted to the monitoring module into a communication format. A communication information issuing unit 408 that issues communication setting information determines whether the UI button information corresponding to the setting information for extending the button of the UI of the image forming apparatus needs to be transmitted to the monitoring module.

Further, the communication information issuing unit 408 has a function for determining whether the appropriate UI setting information of the image forming apparatus needs to be transmitted to a target monitoring module when a command is requested.

The communication information issuing unit 408 refers to corresponding information about the image forming apparatus in the information storage unit 401 using the identifier of the image forming apparatus received from the communication I/F unit 404 and determines to transmit the UI setting information appropriate for the image forming apparatus which is a communication target.

Further, the communication command interpretation unit 407 receives the status data of the image forming apparatus from the monitoring module, the service information managed by the management server 106, and a request communication from the UI of the image forming apparatus generally when it is in a monitoring state. Descriptions of storage processing of the status data of the image forming apparatus and access processing to the service information when the image forming apparatus is monitored are omitted.

Figure 5:
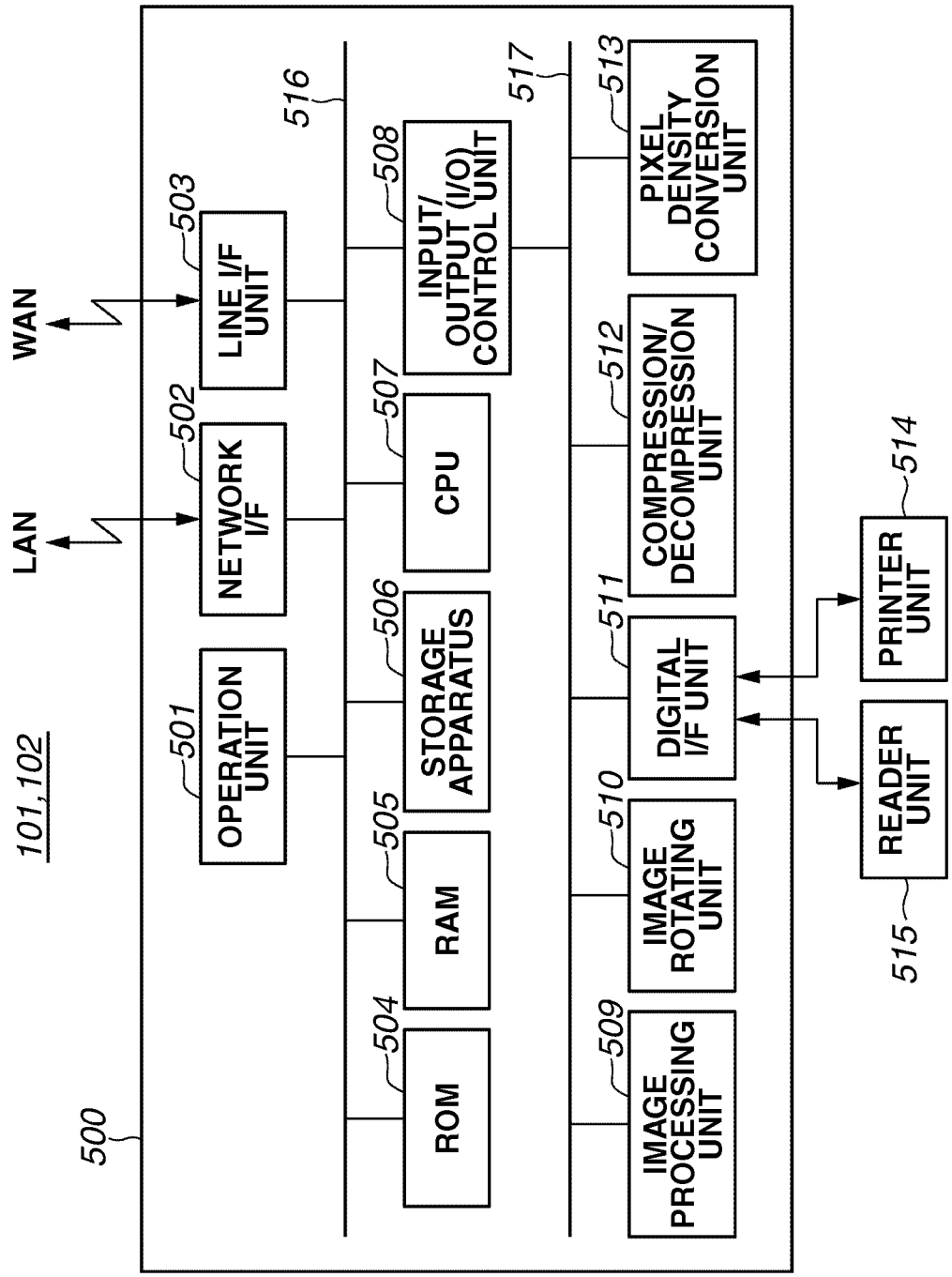
FIG. 5 is a block diagram illustrating a control unit in image forming apparatuses illustrated in FIG. 1 according to the first exemplary embodiment of the present invention.

FIG. 5 is a block diagram illustrating a control unit in the image forming apparatuses 101 and 102 illustrated in FIG. 1. The image forming apparatus includes a reader unit 515, a printer unit 514, and a multi function printer (MFP) provided with a facsimile transmission/reception unit. Further, the image forming apparatus includes a single function printer (SFP) as well.

The image forming apparatus can include an optional apparatus to extend a function. For example, on the printer unit 514, a paper-discharge apparatus which also performs post sheet processing can be mounted. The post sheet processing includes staple processing, folding processing, or binding processing which combines both the staple processing and the folding processing.

The processing that the monitoring module performs in the image forming apparatus is described as an example in the present exemplary embodiment. The monitoring module is processed in a control unit 500 in the image forming apparatus, manages individual information about the image forming apparatus, and transmits the status information of the image forming apparatus to the management server.

The control unit 500 mainly controls each functional processing such as printing and scanning. In addition, the control unit 500 also controls communication with the management server 106 based on the monitoring module.

In FIG. 5, each constitutional element of the control unit 500 is connected to a system bus 516 or an image bus 517.

A read-only memory (ROM) 504 stores a control program for executing each functional processing of the image forming apparatus and a program for monitoring the image forming apparatus. These programs are executed by a CPU 507. The monitoring program may be acquired from the management server 106 via the network and stored in a flush memory, which can be updated. With this arrangement, on a regular basis or according to the user's instruction, the monitoring processing can be performed using a newest monitoring program.

The RAM 505 is a working memory area where the program is executed and used as an image memory which temporarily stores image data and the status information of the image forming apparatus necessary for the monitoring program in performing monitoring.

A storage device 506 is a non-volatile storage device and stores mode settings of various operations, counter values, and operation logs that need to be stored also after the image forming apparatus 101 is restarted. The storage device 506 is, for example, a hard disk.

A network I/F 502 is an interface unit that connects the management server 106 to a local area network (LAN) and communicates with the management server 106 via the LAN. A line I/F unit 503 is connected to an integrated services digital network (ISDN) or a public telephone network, controlled by a communication control program in the ROM 504 and transmits/receives the data to/from a remote terminal via the ISDN, the I/F, a modem, or a network control unit (NCU). When a facsimile is transmitted/received, the line unit I/F 503 is used.

A operation unit 501 includes a display unit or a key input unit, which are controlled by the CPU 507. The operator gives instructions to read out with the scanner, make various settings for outputting prints with the printer unit 514, or perform and stop operation via the key input unit.

An input/output (I/O) control unit 508 functions as a bus bridge that connects a system bus 516 and an image bus 517 that forwards the image data at high speed.

For example, a protocol control information (PCI) bus or an IEEE 1394 constitutes the image bus 517. The image bus 517 includes processing units as described below.

A digital I/F unit 511 connects the reader unit 515 or the printer unit 514 to the control unit 500 in image forming apparatus and converts the image data into a synchronous system/non-synchronous system. The information detected by various sensors disposed at each position in the reader unit 515 and the printer unit 514 is output to the system bus 516 via the digital I/F unit 511 and the I/O control unit 508.

An image processing unit 509 corrects/processes/edits input/output image data. An image rotating unit 510 rotates the image data. An image compression/decompression unit 512 compresses/decompresses multivalued image data into a Joint Photographic Experts Group (JPEG) and binary image data into either one of a Joint Bi-Level Image Experts Group (JBIG), Modified Modified READ (MMR), Modified READ (MR), and Modified Huffman (MH). An image density conversion unit 513 converts resolution of output-image data.

The CPU 507 executes the control program to read out the operation information and the trouble information including the counter value and the operation log in the storage device 506, which are transmitted to the management server 106 via the network I/F 502 as the status information of the image forming apparatus.

The UI button information of the image forming apparatus received from the management server 106 via the network I/F 502 is temporarily stored in the RAM 505 and processed by the CPU 507. According to a processing result, the button information for displaying the information about the image forming apparatus managed by the management server 106 is extended in menu information for the user displayed on the operation unit 501.

FIG. 6 illustrates an example of a configuration of programs and data that are developed in the ROM 504 or the storage device 506 illustrated in FIG. 5. In FIG. 6, only the programs and the data according to the present exemplary embodiment are illustrated, and other programs and data are omitted.

FIG. 6 illustrates a system basic program performing basic control including an OS 601. A management program 602 manages the image forming apparatus.

A message transmission/reception program 603 controls transmission/reception of the message. More specifically, the message transmission/reception program 603 controls the reception of the UI button information of the image forming apparatus and other setting instructions from the management server 106, or the transmission of the status information about the image forming apparatus and the command request.

A analysis program 604 analyzes the UI button information of the image forming apparatus received by the message transmission/reception program 603 and other command processing, and inputs results to an appropriate program for next processing.

When the UI button information about the image forming apparatus is received from the management server 106, the analysis program 604 issues processing for extending the button to a UI setting change program 611 in order to change the UI setting of the image forming apparatus. The UI setting change program 611 performs the button extension processing on a specified menu together with specified processing as the UI button control of the image forming apparatus.

When the analysis program 604 analyzes and determines the command received from the management server 106 as the command for setting schedule information, the analysis program 604 analyzes the schedule setting information. The analysis program 605, then, determines which kind of data is to be transmitted to the management server 106 according to what schedule.

A processing program 606 includes processing programs 607, 608, 609, and 610 as described below.

When the event occurs in the image forming apparatus, the processing program 607 for transmitting the event information checks an analysis result to determine at what timing the event data is to be transmitted to the management server 106.

The processing program 607 transmits the event information according to the analysis result. The processing program 607 transmits the event information of each processing program as well.

A processing program 608 transmits the schedule information. A processing program 609 transmits the counter information. A processing program 610 changes the schedule setting.

A state DB 612 of the image forming apparatus stores basic information 613 about the image forming apparatus such as firmware and a type of the image forming apparatus, and error information 614 about errors which have occurred by then.

Further, the state DB 612 stores event information including alarm information 615, charging counter information 616, and function counter information 617. In addition, the state DB 612 stores information based on functions provided by the management server 106.

For example, the state DB 612 stores the jam history information, lifetime information about parts, and the management information of the toner storage.

A setting information DB 618 for setting the UI of the image forming apparatus manages button information 619 about the extended and added button of the UI of the image forming apparatus. Further, the setting information DB 618 manages an access-destination address 620, which indicates to which access destination of the management server 106 the information to be provided to the user is connected. The information is provided to the user by pressing down the extended and added button on the UI of the image forming apparatus.

If the image forming apparatus manages a display mode for a plurality of user (not illustrated in FIG. 6), information about the extended button, for example, which button is displayed on which mode screen, is managed.

A storage region 621 is used to load a program illustrated in FIG. 17 which is executed by the CPU 507A.

Figure 7:
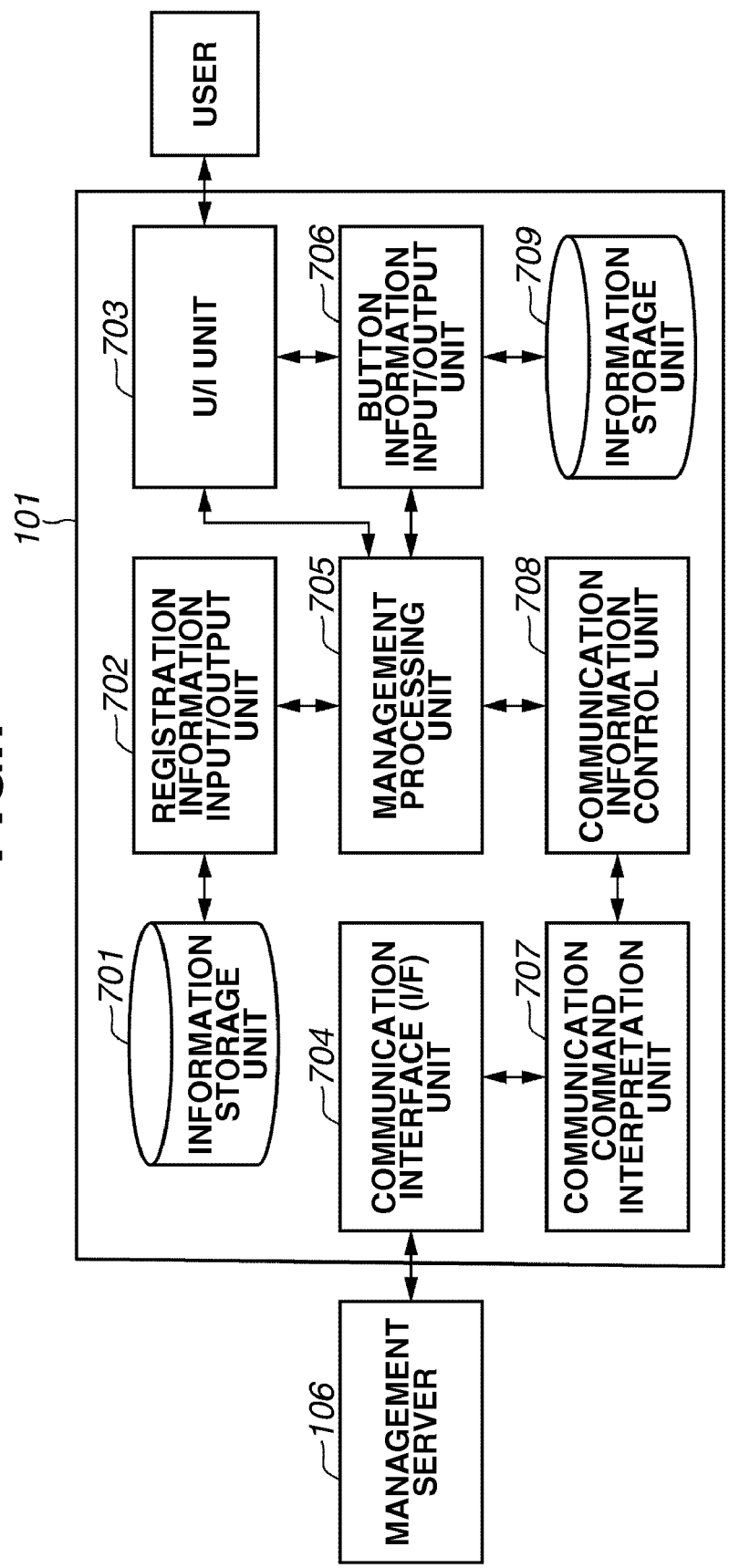
FIG. 7 is a block diagram illustrating functions of an application for displaying a UI of the image forming apparatus illustrated in FIG. 1 according to the first exemplary embodiment of the present invention.

FIG. 7 is a block diagram illustrating a function of an application for displaying the UI of the image forming apparatus 101 illustrated in FIG. 1. The function of the application program for issuing the extension setting of the button on the UI of the image forming apparatus in a UI unit 703 of the image forming apparatus 101 will be described below.

The application program includes a UI unit 703 which receives an instruction input by the user. The user controls the image forming apparatus using the UI unit 703, for example, to display the status of the image forming apparatus and to set a network.

In the UI unit 703, the application program acquires the button information specified by the management server 106 from an information storage unit 709 via a button information input/output unit 706 and displays the extended button for the user.

In a management processing unit 705, the application program monitors the status information of the image forming apparatus. The management processing unit 705 stores the counter information, the information of the event occurring in the image forming apparatus 101 in the information storage unit 701 via the registration information input/output unit 702 according to the set schedule.

In addition, the management processing unit 705 stores the UI button information received from the management server 106 in the information storage unit 709 via the button information input/output unit 706.

Further, the application program includes the communication I/F unit 704 that communicates with the management server 106 and communication command interpretation unit 707 that extracts the setting data and the command from the communication information received from the management server 106.

The communication command interpretation unit 707 extracts the UI button information from the data received from the management server 106 and inputs the UI button information to the communication information control unit 708. The communication information control unit 708 receives the data and the command from the management server 106 via the communication command interpretation unit 707.

The communication information control unit 708 inputs the data and the command to the management processing unit 705 and performs control to transmit the counter information and the event information managed by the management processing unit 705 to the management server 106 according to the predetermined setting.

FIG. 8 illustrates a communication sequence performed by a management system according to the present exemplary embodiment. FIG. 8 illustrates a part of a communication sequence example based on service processing among the image forming apparatus 101, the management server 106 and the user. Same reference numeral is given to the same unit as that in FIG. 1.

In FIG. 8, as an initial sequence for monitoring the image forming apparatus, a sequence starts when the manager 107 registers the information of the image forming apparatus to be monitored with the management server 106. Each step S801, S802, S803, S804, S805, S806, S807, S808, S809, S810, S811, S812, S813, S814 and S815 is illustrated in FIG. 8.

As an example, the management server 106 that monitors the image forming apparatus 100 will be described below. The identification information 319, the type information 320, the UI button information 321, the address information 322 of the UI access destination are set in the management table 318 of the image forming apparatus to be monitored as illustrated in FIG. 3 in step S801.

The image forming apparatus that responds with the registered UI button information 321 and the address information 322 of the UI access destination in step S811 will be described below.

However, in an actual operation, when the image forming apparatus is installed, a communication test from the image forming apparatus to the management server 106 can be conducted first. A type of the communication for the communication test refers to an initial communication from the image forming apparatus 100.

The communication test means the communication performed after the image forming apparatus 100 starts to acquire the setting information from the management server 106. The sequence for conducting first the communication test from the image forming apparatus 100 will be described below with reference to FIG. 9.

According to the sequence illustrated in FIG. 8, the setting information is requested from the management server 106 using the communication test, which is the initial communication from the image forming apparatus 100. However, the request for the setting information is not limited to the communication test, which is the initial communication, but the setting information may be acquired by the image forming apparatus 100 from the management server 106 as one of the functions.

In step S801, the information about the image forming apparatus 100 to be monitored is registered with the storage device 208 in the management server 106 by the manager 107 who manages the image forming apparatus 100 as described below. The information about the image forming apparatus 100 to be monitored includes information necessary for monitoring the image forming apparatus 100, for example the ID and the type name of the image forming apparatus, and a type of the service to be used, which are registered with the storage device 208. The UI registration unit 403 of the management server 106 is used to register the information.

Next, in step S802, upon receiving the registration of the information about the image forming apparatus 100 to be monitored in step S801, the button information issuing unit 405 generates the information about the button to be extended on the UI of the image forming apparatus 100 from the selected service functions.

The service functions are predetermined by contracts between a side which provides the service functions and a client side which introduces the image forming apparatus 100. Therefore, if the user of the image forming apparatus selects the service function which is not in service, the button corresponding to the service function is not extended nor displayed through the processing.

Next, in step S803, the image forming apparatus 100 is installed in a client's office and an initial setting is provided. The ID of the image forming apparatus 100 to be installed is previously informed to the user who registers the image forming apparatus 100 with the management server 106. Thus, when the image forming apparatus 100 is being installed, the image forming apparatus 100 has been already registered with the management server 106.

Next, in step S804, after completion of the initial setting of the image forming apparatus 100, the communication test is conducted to remotely monitor the image forming apparatus 100. According to the present exemplary embodiment, a method of the communication test is issued using the HTTP in its sequence. However, it is only required to confirm that the communication has been surely performed.

Next, in step S805, upon receiving the HTTP communication through the processing in the management server 106, the management server 106 prepares an HTTP response. In step S806, the management server 106 extracts the ID of the image forming apparatus 100 through the communication processing in step S804, and then finds out which ID the image forming apparatus 100 having conducted the communication test has.

In step S808, the image forming apparatus 100 requests the setting information from the management server 106. The request corresponds to an inquiry processing about the setting based on which the image forming apparatus should be operated when the image forming apparatus 100 is to be managed.

In step S809, as the HTTP response, the management server 106 prepares the communication responding to step S808. In step S810, the management server 106 authenticates the image forming apparatus 100 with the ID thereof and acquires the UI button information of the image forming apparatus to be monitored which is stored in the management server 106.

In step S811, the acquired UI button information is transmitted to the image forming apparatus 100 as the HTTP response. At this time, the address information of the UI access destination and the UI button information are transmitted together to the image forming apparatus 100 as.

In step S812, the image forming apparatus 100 extends the button on the UI of the image forming apparatus according to the received UI button information. In step S813, a notification of the setting completion that informs an end of the button extension is transmitted to the management server 106.

Figure 16:
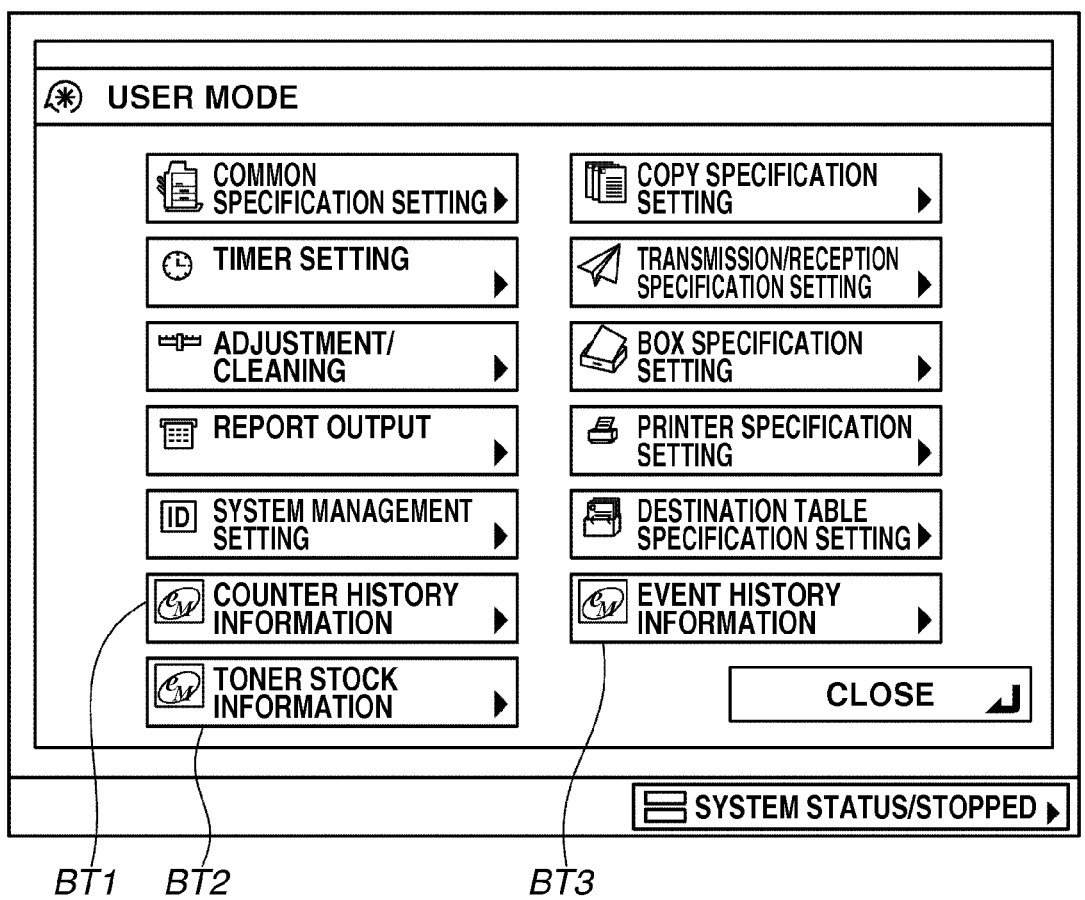
FIG. 16 illustrates a UI which can be provided and displayed on the image forming apparatus according to the second exemplary embodiment of the present invention.

Through the processing, as illustrated in FIG. 16, the buttons based on the service functions are extended and displayed on the UI. When one of the extended buttons is selected, the user can access the client via the network according to the information about the access destination associated with the button.

In step S814, the management server 106 prepares the HTTP response. In step S815, the management server 106 transmits the reception of the notification of the setting completion to the image forming apparatus 100. Thus, the button information previously set as a target to be monitored by the manager 107 of the management server 106, and the access-destination information are transmitted to and set in the image forming apparatus 100 when the communication test is conducted between the management server 106 and the image forming apparatus 100.

According to the present exemplary embodiment, before the communication test is conducted between the management server 106 and the image forming apparatus 100, the manager 107 has completed the setting of the management table 318 of the management server 106.

In an actual service process operated by the serviceman, unlike the case described above, the image forming apparatus is not always registered first, but can be registered after the communication test.

When the image forming apparatus is registered after the communication test, the serviceman conducts the communication test from the image forming apparatus 100, completes the operation, and leaves the client's office.

Afterward, when the image forming apparatus 100 is registered with the management server 106, an access-destination URL is generated in the management server 106. Thus, the UI of the image forming apparatus 100 can be extended using a call of the command.

However, by the method described above, when the image forming apparatus has been installed, the menu of the image forming apparatus is automatically extended after the serviceman has left the office. Thus, troubles or a lot of inquiries about the functions can occur to the user.

To address the problems described above, as illustrated in FIG. 9, a list of all services provided by the management server 106 is transmitted to the image forming apparatuses 101 and 102. The serviceman specifies the button display of which is to be restricted, from among all buttons which can be extended and displayed, corresponding to the service list via each operation unit 501 of the image forming apparatuses 101 and 102. The image forming apparatuses 101 and 102 generate and maintain a list of display-control UI functions corresponding to the specified buttons.

The image forming apparatuses 101 and 102 transmits the maintained list of the display-control UI functions to the management server 106. Subsequently, similarly to the first exemplary embodiment, the button information corresponding to the function except for the restricted function, and the access-destination information are transmitted to the image forming apparatuses 101 and 102 to solve the problems described above. The exemplary embodiment will be described in detail below with reference to FIG. 9.

Figure 9:
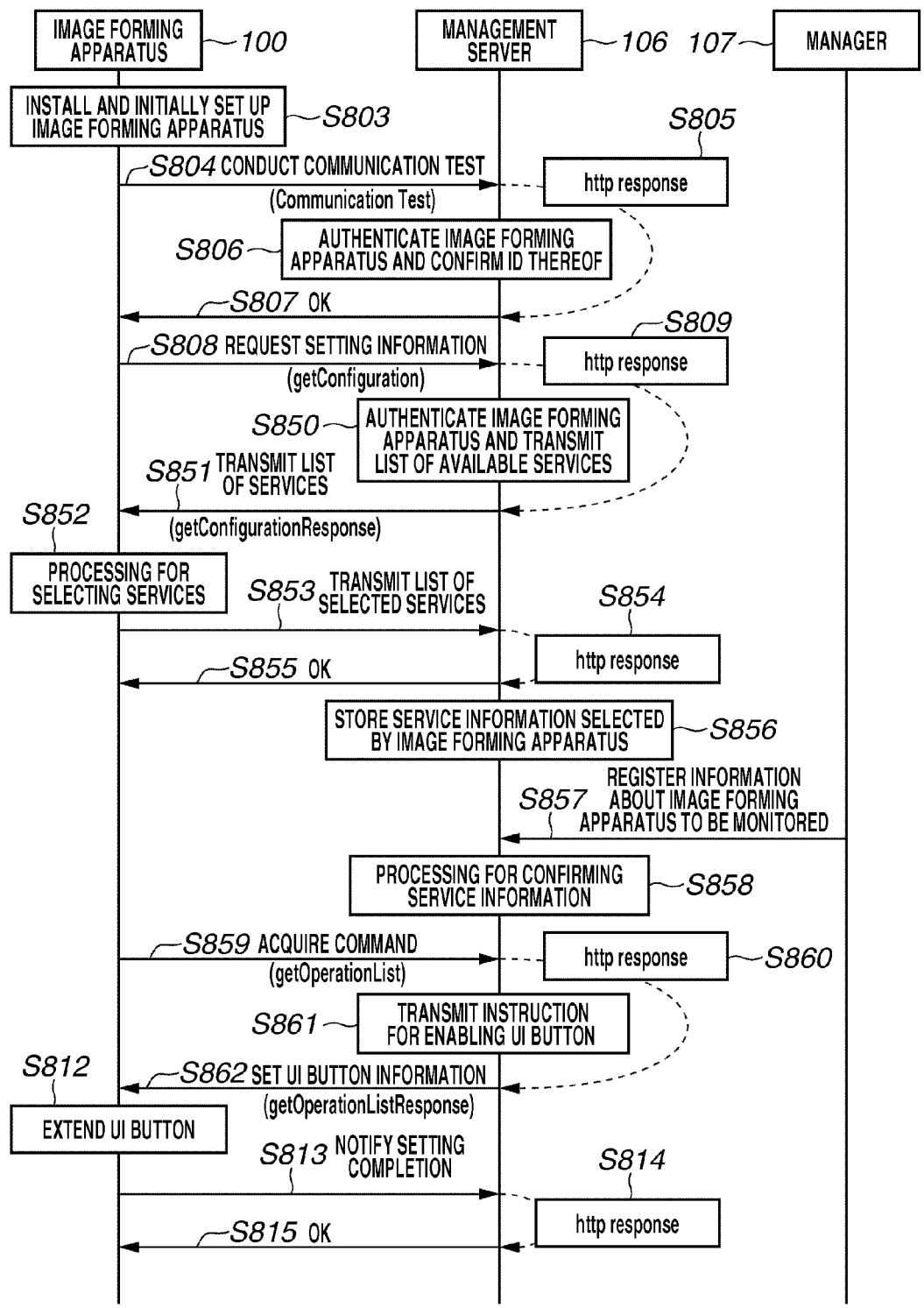
FIG. 9 illustrates a part of an communication sequence example among the image forming apparatus, the management server, and a user according to the first exemplary embodiment of the present invention.

FIG. 9 illustrates apart of a communication sequence example among the image forming apparatus 101, the management server 106, and the user according to the present exemplary embodiment of the present invention. FIG. 8 illustrates the example where the user starts the sequence with the registration of the information about the image forming apparatus with the management server. FIG. 9 illustrates an example where the image forming apparatus is installed and first the communication test is conducted from the image forming apparatus to the management server.

FIG. 9 illustrates the communication sequence of the management system according to the present exemplary embodiment. FIG. 9 illustrates a part of a communication sequence example based on the service processing among the image forming apparatus 101, the management server 106, and the user. Same reference numeral is given to the same unit as that in FIG. 1. S803, S804, S805, S806, S807, S808, S809, S812, S813, S814, S815, S850, S851, S852, S853, S854, S855, S856, S857, S858, S859, S860, S861, and S862 indicate each step.

In the example of the sequence illustrated in FIG. 9, compared to FIG. 8, the information about the image forming apparatus is not registered first. However, since the operations of steps S803, S804, S805, S806, and S807 are the same as those in FIG. 8, the descriptions will not be repeated. When the management server 106 receives the setting information request in step S808 from the image forming apparatus 100, the management information about the image forming apparatus 100 has not yet been registered.

In step S850, after authenticating the image forming apparatus 100, the management server 106 generates an information list of all services provided by the management server 106 and prepares to transmit the list to the image forming apparatus 100. In step S851, the management server 106 transmits the service information list generated in step S850 to the image forming apparatus 100.

In step S852, the image forming apparatus 100 which has received the service information list from the management server 106 in step S851 displays the service information list on the UI of the image forming apparatus displayed at the operation unit 501. The serviceman who sets up the image forming apparatus 100 selects the management service provided by the management server 106.

In step S853, the image forming apparatus 100 transmits to the management server 106 the service information list selected by the serviceman via the operation unit 501. The management server 106 which has received the service information list prepares to transmit the HTTP response to the image forming apparatus 100 in step S854.

In step S855, the management server 106 transmits to the image forming apparatus 100 the response indicating that the management server 106 has received the service information list selected by the serviceman via the operation unit 501 of the image forming apparatus 100.

In step S856, the management server 106 associates the received service information list with the identifier of the image forming apparatus and stores the service information list in the database secured in the storage device 208.

In step S857, the manager 107 who manages the image forming apparatus registers the information about the image forming apparatus to be monitored. When it is detected from the ID of the image forming apparatus that the image forming apparatus registered by the manager 107 has already completed the communication test after the image forming apparatus to be monitored is registered, the processing proceeds to step S858. In step S858, the service provided for the image forming apparatus is activated and the service information including a preparation for extending a button on the UI of the image forming apparatus is checked.

Upon receiving the communication for acquiring the command from the image forming apparatus 100 in step S859, the management server 106 prepares to transmit the HTTP response to the image forming apparatus 100 in step S860.

The management server 106 identifies the image forming apparatus from the ID thereof to which the button extension on the UI of the image forming apparatus is to be instructed. In step S861, the management server 106 transmits to the image forming apparatus 100 an instruction to activate the UI button of the image forming apparatus.

In step S862, the image forming apparatus 100 receives the instruction for setting the UI button information from the management server 106. In step S812, the image forming apparatus 100 extends the UI button thereof according to the instruction.

FIG. 10 illustrates an example of a communication data sample transmitted from the management server 106 to the image forming apparatus 100 illustrated in FIG. 1. The present example corresponds to the communication data sample in step S811 as illustrated in FIG. 8, and a communication data sample in step S851 as illustrated in FIG. 9. A configuration of the communication data related to the setting of the UI button information to be transmitted to the image forming apparatus 100 by the management server 106 will be described below.

In FIG. 10, the communication data sample 1 in S811 is reply data to the image forming apparatus 100 responding to the setting information request S808 received by the management server 106 illustrated in FIG. 8.

A command 1001 indicates that the data is the reply data and is transmitted to the image forming apparatus 100 to set the UI button information in step S811 illustrated in FIG. 8.

A command information 1002 includes information 1003, 1004, and 1005 corresponding to the processing result of the previous communication.

The information 1003 stores data indicating whether the management server 106 has been able to receive the setting information request, which is the communication from the image forming apparatus 100. The information 1004 stores date and time when the data processing is completed. The information 1005 stores detailed description of information when the communication result of the information 1003 is error.

The information 1006 is the UI button information, and settings 1007, 1008, 1009, 1010, 1011, 1012, 1013, 1014, and 1015 store detailed data. The setting 1007 stores ID information of data of the button to be extended. The setting 1008 stores title information corresponding to the button ID defined by the setting 1007. The title information is displayed as the title of the button on the UI of the image forming apparatus.

The setting 1009 stores an address, which is an access destination corresponding to the button ID defined by the setting 1007. When the button is pressed down on the UI of the image forming apparatus, the information about the image forming apparatus which is stored in the management server 106 and corresponds to the pressed button can be acquired.

According to the communication data sample 1 illustrated in S811 in FIG. 10, the address of the access destination is described as the URL and the data is passed via the HTTP communication. Since here a purpose is to acquire the service information about the image forming apparatus, the protocol or data is not particularly limited to any embodiments.

The settings 1010, 1011, 1012, 1013, 1014, and 1015 are repeated for each type of the data and store the data by the number of the UI buttons of the image forming apparatus.

Communication sample data 2 in S851 illustrated in FIG. 10 is the reply data responding to the setting information request received by the management server 106 in step S808 in FIG. 9.

The command 1001 indicates that the data is the reply data and is equivalent to the setting of the UI button information in step S862 illustrated in FIG. 9.

The command information 1002 includes the information 1003, 1004, and 1005 corresponding to the processing result of the previous communication. Since the data units of the information 1002, 1003, 1004, and 1005 are the same as those in the communication data sample 1 in S811, the descriptions will not be repeated.

A service list 1051 stores an information list of all available services provided by the management server 106. Service IDs 1052, 1054, 1056, and 1058 store the ID assigned for each service provided by the management server 106. Service information 1053 stores the service information which is provided by the management server 106 and associated with the service ID 1052.

In the service list 1051, the service information 1053 corresponds to the counter history information, the service information 1055 corresponds to the event history information, the service information 1057 corresponds to the toner storage information, and the service information 1059 corresponds to the lifetime information of parts.

As described above, according to the present exemplary embodiment, the service list 1051 repeatedly stores a list of the service information by the number of the services provided by the management server 106.

Based on the above-described configuration, an example of the data processing performed by the management server 106 according to the present exemplary embodiment will be described. In the example of the data processing below, in order to simplify the processing, only one image forming processing is managed. However, the management server 106 actually manages a plurality of image forming apparatuses. In such a case, individual processing is performed on each image forming apparatus, and a procedure of the processing will be obvious.

According to the example of the data processing, when the image forming apparatus transmits any communication, the management server 106 recognizes a communication method and gives an instruction for the transmission setting such that the information to be transmitted from the image forming apparatus can be sufficient for the management server 106.

FIG. 11 is a flowchart illustrating an example of data processing at the management server according to the present exemplary embodiment of the present invention. The exemplary embodiment describes the processing to be performed when the management server 106 receives the communication request from the image forming apparatus 100 in a normal monitoring mode. Further, the present exemplary embodiment describes processing performed when the management server 106 receives the request of the registration of the image forming apparatus to be monitored from the user of the management server 106. Each step S1101, S1102, S1103, S1104, S1105, S1106, S1107, S1108, S1109, and S1110 can be realized when the CPU 202 of the management server 106 illustrated in FIG. 2 loads the module in the RAM 204 and performs the module.

Further, according to the present exemplary embodiment, the management server 106 automatically determines the UI extension setting information from which the service information can be directly acquired from the image forming apparatus 100 according to a type of the management service registered with the management server 106 and transmits the setting information.

In other words, whether or not the user updates the service information, or whether registration or communication test of the image forming apparatus is conducted first, the management server 106 transmits the instruction to the image forming apparatus 100 at any time such that the appropriate UI button of the image forming apparatus can be provided.

According to the example of the data processing, the monitoring module is incorporated in the image forming apparatus 100 and the management server 106 communicates with the image forming apparatus 100.

In step S1101, a loop, which is internal processing of the management server 106, starts and the management server 106 enters a mode for monitoring the image forming apparatus 100. In step S1102, the CPU 202 of the management server 106 determines whether the communication is received from the image forming apparatus 100 via the network I/F 205.

When the CPU 202 determines that the communication is received from the image forming apparatus 100 (YES in step S1102), the processing proceeds to step S1104 to check whether the type of the communication is the communication test or another communication. As the communication test, the image forming apparatus 100 requests the setting information prepared by the management server 106.

On the other hand, when the CPU 202 of the management server 106 determines that the communication is not been received from the image forming apparatus 100 in step S1102 (NO in step S1102), the processing proceeds to step S1103. In step S1103, the manager, who is the user of the management server 106, performs the UI processing, registers the image forming apparatus 100 with the management server 106, or updates the registered information. The processing in step S1103 will be described in detail with reference to FIG. 12.

In step S1104, the CPU 202 of the management server 106 determines whether the type of the communication is the communication test. When the CPU 202 determines that the communication type is the communication test (YES in step S1104), the processing proceeds to step S1105. When the CPU 202 determines that the communication type is not the communication test (NO in step S1104), the processing proceeds to step S1106.

In step S1106, the CPU 202 of the management server 106 extends the button on the UI of the image forming apparatus using a normal schedule-system communication, and the processing proceeds to step S1110. A request for the setting information will be described in detail with reference to the flowchart illustrated in the FIG. 13.

In step S1104, when the CPU 202 determines that the communication type is the communication test (YES in step S1104), the processing proceeds to step S1105. In step S1105, the CPU 202 determines whether the image forming apparatus has been already registered from the identifier of the image forming apparatus which has transmitted the request and the data of the master data DB of the image forming apparatus to be monitored.

When the CPU 202 determines that the image forming apparatus to be monitored has not been registered yet (NO in step S1105), the processing proceeds to step S1108, and the CPU 202 generates the list of services provided by the management server 106 and transmits the list to the image forming apparatus 100.

In step S1109, the CPU 202 receives the service option information selected by the serviceman at the image forming apparatus. The CPU 202 associates the ID of the image forming apparatus with the selected service option information, and stores the ID and the service option information in the master data DB of the image forming apparatus to be monitored. The processing proceeds to step S1110 and the management server 106 starts to monitor the image forming apparatus.

Figure 13:
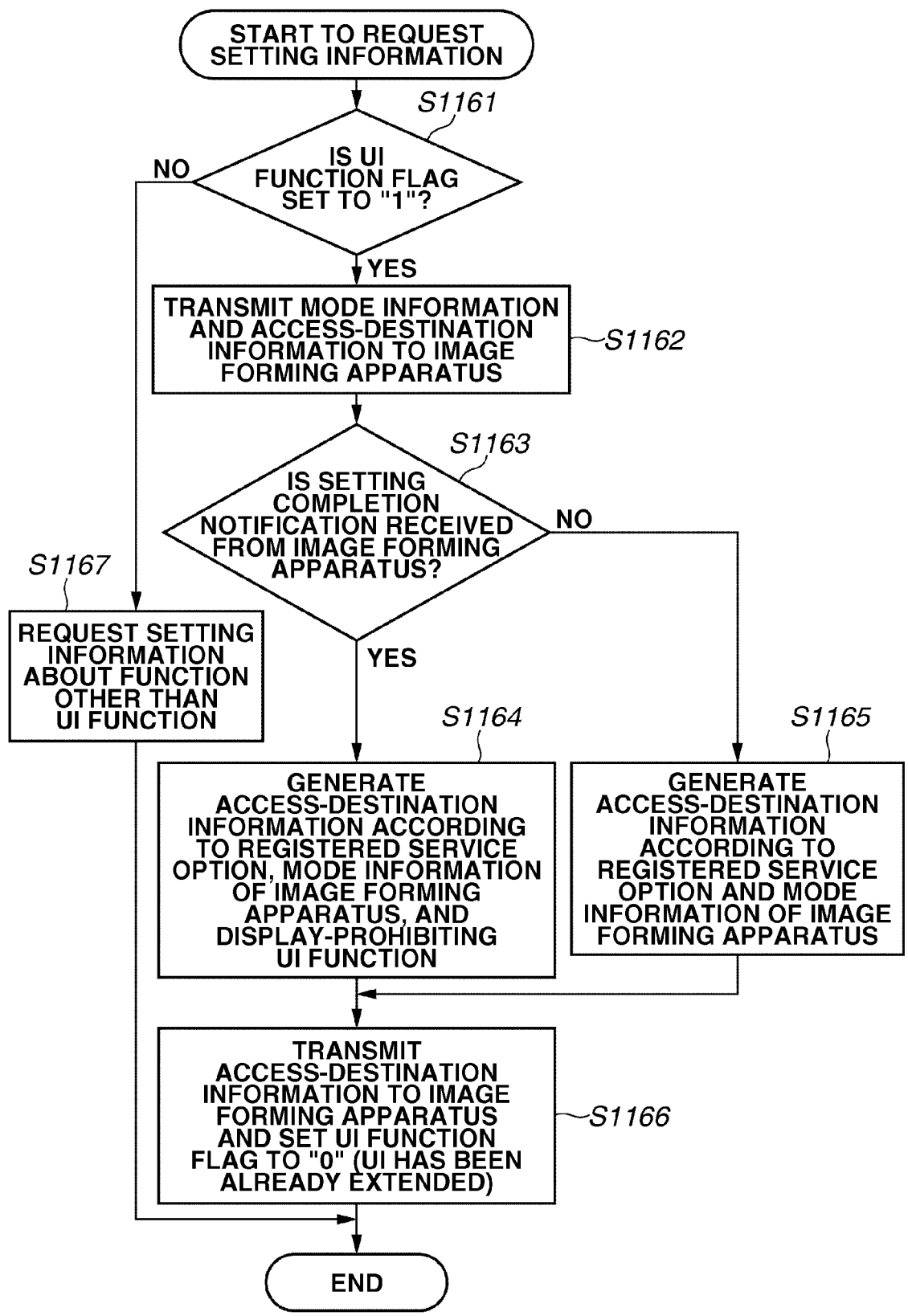
FIG. 13 is a flowchart illustrating an example of data processing performed by the management server according to the present exemplary embodiment of the present invention.

On the other hand, in step S1105, when the CPU 202 determines that the image forming apparatus has been already registered with the management server 106 (YES in step S1105), the processing proceeds to step S1107. In step S1107, the CPU 202 requests the setting information as illustrated in FIG. 13.

Throughout the processing, the management server 106 recognizes the communication from the image forming apparatus via the network and the type of the provided service information at any time. Thus, the management server 106 can give the instruction to the image forming apparatus such that the appropriate UI button of the image forming apparatus can be provided even if the user is not conscious.

Figure 12:
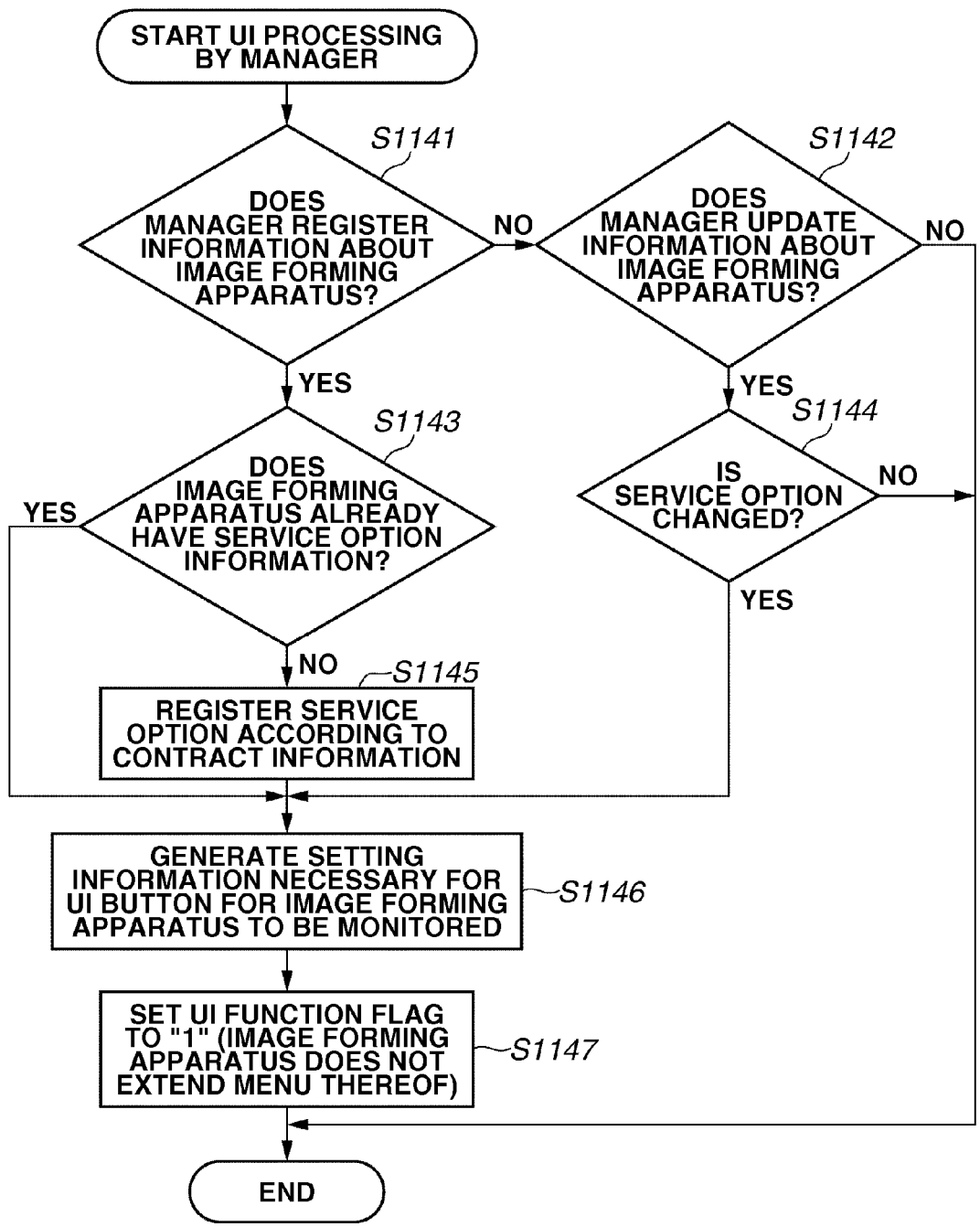
FIG. 12 is a flowchart illustrating an example of data processing performed by the management server according to the present exemplary embodiment of the present invention.

FIG. 12 is a flowchart illustrating an example of data processing at the management server according to the present exemplary embodiment of the present invention. The present exemplary embodiment describes the UI processing performed by the manager at the management server 106 in detail.

Each step S1141, S1142, S1143, S1144, S1145, S1146, and S1147 can be realized when the CPU 202 of the management server 106 illustrated in FIG. 2 loads the module in the RAM 204 and performs the module.

The processing proceeds from Step S1102 to step S1103 as illustrated in FIG. 11. Upon reception of the instruction for registering the image forming apparatus from the manager, the UI processing by the manager starts.

In step S1141, the CPU 202 of the management server 106 determines whether an operation is the registration of the information about the image forming apparatus by the manager or another operation. When the CPU 202 determines that the operation by the manager is the registration of the image forming apparatus (YES in step S1141), the processing proceeds to step S1143. When the CPU 202 determines that the operation is not the registration of the image forming apparatus (NO in step S1141), the processing proceeds to step S1142.

In step S1143, the CPU 202 determines whether the master data DB of the image forming apparatus to be monitored already has the service option information, from the ID of the image forming apparatus during the registration of the image forming apparatus. This is because, when the image forming apparatus 100 has transmitted the communication before the manager registers the image forming apparatus, the service option is likely to have been previously defined.

When the CPU 202 of the management server 106 determines that the master data DB already has the service option information of the image forming apparatus to be monitored (YES in step S1143), the processing proceeds to step S1146.

On the other hand, in step S1143, when the CPU 202 of the management server 106 determines that the master data DB does not have the service option information (NO in step S1143), the processing proceeds to step S1145. In step S1145, the service option according to contract information input from the UI is associated with the ID of the image forming apparatus and the service option is registered with the master data DB of the image forming apparatus to be monitored.

On the other hand, when the CPU 202 of the management server 106 determines that the operation is not the registration of the image forming apparatus in step S1141 (NO in step S1141), the processing proceeds to step S1142. In step S1142, the CPU 202 determines whether the processing which the manager is to perform is an update of the information about the image forming apparatus. When the CPU 202 determines that the processing is the update of the information about the image forming apparatus (YES in step S1142), the processing proceeds to step S1144. Further, the CPU 202 determines whether the processing is a change of the service option.

When the CPU 202 determines that the processing is not the change of the service option (NO in step S1144), the processing ends since the processing has nothing to do with the extension of the UI button of the image forming apparatus.

On the other hand, in step S1144, when the CPU 202 determines that the processing is the change of the service option (YES in step S1144), the processing proceeds to step S1146.

In step S1146, the CPU 202 generates the setting information necessary for the UI button displayed on the image forming apparatus when the image forming apparatus is registered or upgraded, and the processing proceeds to step S1147.

In step S1147, the CPU 202 inputs "1" to a UI function flag which indicates to the image forming apparatus that the instruction is needed to update the setting information about the UI button, and then the UI processing by the manager ends.

FIG. 13 is a flowchart illustrating an example of data processing at the management server according to the present exemplary embodiment of the present invention. The exemplary embodiment describes processing in which the management server 106 responds to the request for the setting information from the image forming apparatus. Each step S1161, S1162, S1163, S1164, S1165, S1166, and S1167 can be realized when the CPU 202 of the management server 106 illustrated in FIG. 2 loads the module in the RAM 204 and performs the module.

The processing proceeds from step S1105 to S1107 as illustrated in FIG. 11. Upon reception of the request for the setting information from the image forming apparatus, the processing for requesting the setting information starts.

In step S1161, the CPU 202 determines whether "1" is specified for the UI function flag set in the UI processing by the manager or another value is set. When the CPU 202 determines that a value other than "1" is specified for the UI function flag (NO in step S1161), the processing proceeds to S1167. The setting information other than the UI function is requested, and then the processing ends. Since the processing is not included in the present invention, descriptions will be omitted.

When the CPU 202 determines that "1" is specified to the UI function flag in step S1161 (YES in step S1161), the processing proceeds to step S1162. In step S1162, the CPU 202 of the management server 106 transmits to the image forming apparatus 100 the access-destination information necessary for the image forming apparatus to extend the UI button.

In step S1163, the CPU 202 determines whether to have received the notification of the setting completion informing that the access-destination information set in the image forming apparatus in step S1162 is successfully set in the image forming apparatus.

When the CPU 202 determines that the notification of the setting completion has been received (YES in step S1163), in step S1164, the CPU 202 generates the access-destination information according to the registered service option, the mode information of the image forming apparatus, and the display-prohibited UI function list information.

In step S1166, the CPU 202 of the management server 106 transmits the access-destination information to the image forming apparatus 100. Further, the CPU 202 sets the UI function flag to "0", and sets the flag to indicate that there is no more information left to change the setting, and then the processing ends.

On the other hand, when the CPU 202 determines that the notification of the setting completion has not been received in step S1163 (NO in step S1163), in step S1165, the CPU 202 generates the access-destination information according to the registered service option and the mode information of the image forming apparatus, and the processing proceeds to step S1166.

Figure 14:
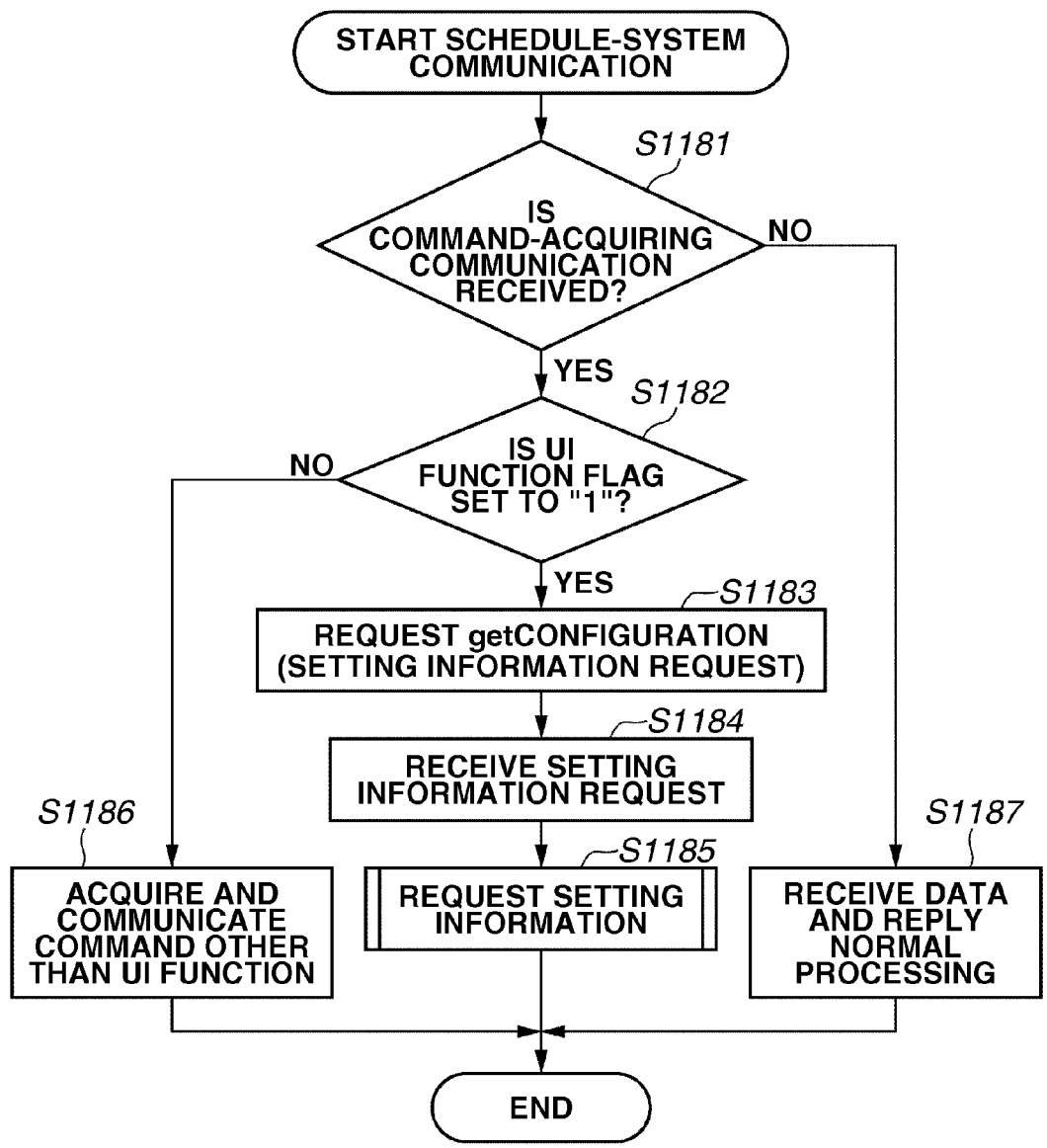
FIG. 14 is a flowchart illustrating an example of data processing performed by the management server according to the present exemplary embodiment of the present invention.

FIG. 14 is a flowchart illustrating an example of data processing at the management server according to the present exemplary embodiment of the present invention. The present exemplary embodiment describes the communication processing of the schedule system in the management server 106 in detail. Each step S1181, S1182, S1183, S1184, S1185, S1186, and S1187 can be realized when the CPU 202 of the management server 106 loads the module in the RAM 204 and performs the module.

When the CPU 202 determines that the communication request from the image forming apparatus is not the communication test, the processing proceeds from step S1104 to step S1106 as illustrated in FIG. 11 (NO in step S1104), and the communication processing of the schedule system starts.

In step S1181, the CPU 202 determines whether the communication received by the image forming apparatus is the command-acquiring communication which means the command acquirement corresponding to step S859 illustrated in FIG. 9 or another communication. When the CPU 202 determines that the communication is not the command-acquiring communication (NO in step S1181), the processing proceeds to step S1187. The normal-monitoring status information of the image forming apparatus is acquired, and then the processing ends.

On the other hand, when the CPU 202 determines that the communication from the image forming apparatus is the command-acquiring communication in step S1181 (YES in step S1181), the processing proceeds to step S1182. In step S1182, the CPU 202 determines whether "1" is specified to the UI function flag which notifies whether the UI includes the UI button information of the image forming apparatus to be specified to the image forming apparatus.

When the CPU 202 determines that "1" is not specified to the UI function flag (NO in step S1182), the processing proceeds to step S1186. In step S1186, the CPU 202 performs the communication processing for acquiring the commands other than the UI function, and then the processing ends.

On the other hand, when the CPU 202 determines that "1" is specified to the UI function flag in step S1182 (YES in step S1182), the processing proceeds to step S1183. The CPU 202 transmits to the image forming apparatus the access-destination information necessary for the image forming apparatus to extend the UI button.

In step S1184, the CPU 202 receives the notification of the setting completion informing that the access-destination information set in the image forming apparatus in step S1183 is successfully set in the image forming apparatus. In step S1185, the CPU 202 sets the UI function flag to "0" to indicate that there is no more information left to change the setting, and then the schedule-system communication processing ends. Since the schedule-system communication processing is not included the processing for extending the UI button any more, the processing ends.

According to the present exemplary embodiment, the management server can display at any time the button information synchronizing with the service provided for the UI of the image forming apparatus to be monitored. Therefore, the image forming apparatus can acquire the management information about the image forming apparatus managed by the management server without an unnecessary login or search from the UI of the image forming apparatus.

According to the present exemplary embodiment, the image forming apparatus does not need to update the firmware thereof even if the function of the management server is updated. Thus, the information managed by the management server can be acquired from the UI of the image forming apparatus.

Therefore, convenience of the user using the image forming apparatus and the serviceman managing the image forming apparatus can be improved.

Figure 15:
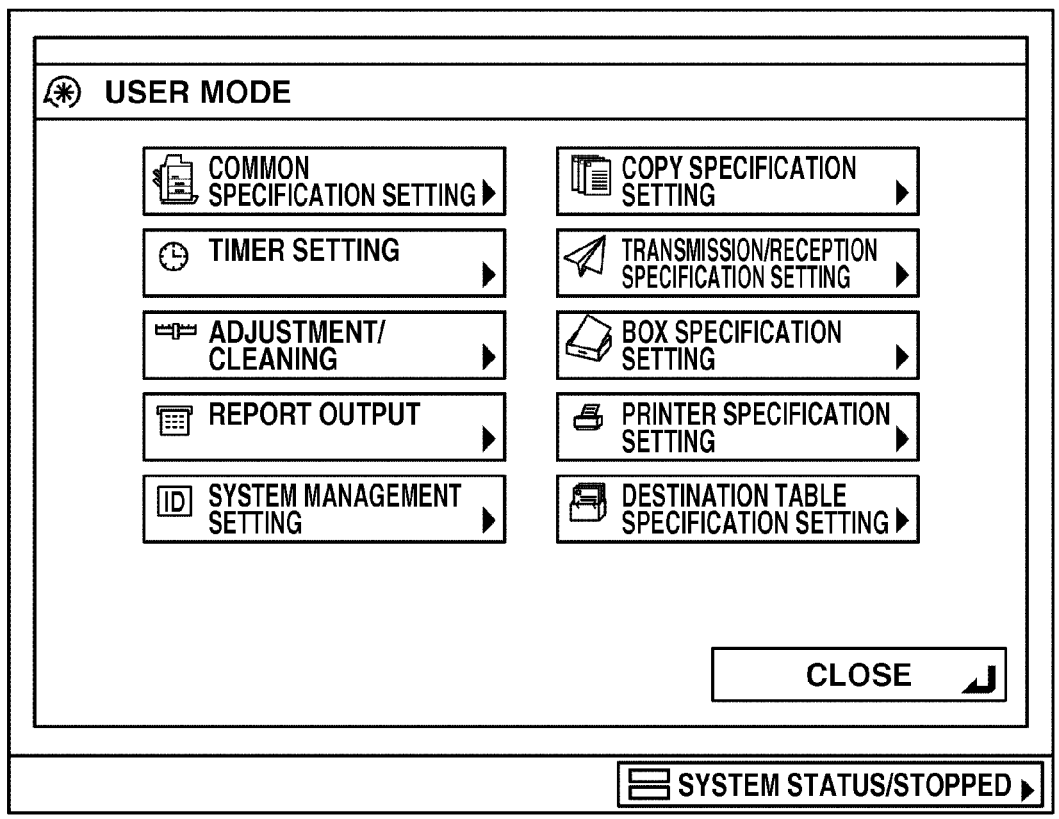
FIG. 15 illustrates a UI which can be provided and displayed on the image forming apparatus according to a second exemplary embodiment of the present invention.

The examples shown in FIGS. 15 and 16 illustrate different kinds of UI information provided for a specific user, for example, a UI for a general user and a UI used by a serviceman.

FIGS. 15 and 16 illustrate examples of UIs which can be provided and displayed on the image forming apparatus according to a second exemplary embodiment of the present invention. For example, FIG. 15 illustrates the example of the UI for the user of the image forming apparatus which is not to be monitored by the management server.

If the processing for extending the UI button is performed on the UI illustrated in FIG. 15, the UI is extended such that the buttons BT1, BT2, and BT3 used for directly acquiring the management information from the management server can be displayed. A second exemplary embodiment describes an example of the UI in a user mode. However, when the serviceman communicates with the management server 106, a service mode is set as an operation mode.

With the setting, the UI may be controlled such that the UI having a form different from the UIs illustrated in FIGS. 15 and 16 can be displayed. When communicating with the image forming apparatus 100, the management server 106 determines whether the operation mode set in the image forming apparatus 100 is the user mode or the service mode for the serviceman.

The image forming apparatus 100 previously informs the management server 106 that the image forming apparatus 100 has the function of the UI for the specific user so that the management server 106 can extend and display the button providing the different service on the UI of each image forming apparatus.

An example in which the button on the UI of the image forming apparatus is extended will be described with reference to FIGS. 8 and 9.

In step S802 illustrated in FIG. 8, the management server 106 generates the UI button information for the image forming apparatus. At this time, the management server 106 generates the UI button information for the user of the image forming apparatus and the UI button information for the serviceman maintaining the image forming apparatus respectively.

During the communication with the image forming apparatus 100, the management server 106 receives the request for the setting information in step S808 and the UI function information of the image forming apparatus at the same time. The management server 106 compares the previously-generated UI button information to the received UI information to generate the appropriate UI button information, and transmits the UI button information to the image forming apparatus 100.

FIG. 17 illustrates an example of UI button information transmitted by the management server to the image forming apparatus according to the second exemplary embodiment of the present invention. According to the present exemplary embodiment, the UI button information includes the mode, the title and the source, and the operation mode includes the user mode and the service mode.

A sequence in which the communication test is conducted from the image forming apparatus 100 to the management server 106 before the image forming apparatus 100 is registered with the management server 106 will be described.

In step S808 illustrated in FIG. 9, the management server 106 receives the request for the setting information and the UI information managed by the image forming apparatus 100 from the image forming apparatus 100 at the same time. In response to the information from the image forming apparatus 100, in step S851, the management server 106 transmits the response corresponding to the UI information to the image forming apparatus 100.

In step S852, the image forming apparatus 100 transmits to the management server 106 the mode information of the UI of the image forming apparatus and the selected service list. The mode information corresponds to either one of the user mode or the service mode for the serviceman.

The management server 106 which has received the mode information displays the service information selected by the service man in step S852 illustrated in FIG. 9 as the list indicating the buttons to be extended and the UIs on which the buttons are to be displayed.

The UI of the image forming apparatus can be extended by selecting one of the buttons described above, and the target user and target service are included in the service information.

According to the present exemplary embodiment, the management server 106 can display the button information which provides the image forming apparatus to be monitored with the service information as illustrated in FIG. 16. More specifically, the image forming apparatus can display the information provided by the management server 106 on the UI customized for each target user.

Since the image forming apparatus 100 prepares an empty button (not illustrated), a title of the button can be displayed based on the access-destination information received from the management server 106.

When the UI of the image forming apparatus is extended, the image forming apparatus can provide the user with the function in the same manner as the button on a local UI.

However, as long as the user use the service on the network, when a trouble occurs in the management server 106 or in the network temporarily, the user cannot acquire the management information of the management server and an error occurs.

Until the image forming apparatus determines that the error has occurred, the user needs to wait during a timeout of the network.

As a method for avoiding the problem described above, a flag which monitors a communication state of the image forming apparatus is provided in the UI setting information DB of the image forming apparatus illustrated in FIG. 6.

Normally, when the image forming apparatus is monitored by the management server 106, the image forming apparatus regularly transmits the counter information or the event information. During the normal communication, when a trouble occurs in the image forming apparatus which cuts communication with the management server 106, a flag informing that the image forming apparatus is in trouble is set to the flag monitoring the communication state of the image forming apparatus.

When the UI of the image forming apparatus is displayed by the user using the image forming apparatus, the CPU 507 of the image forming apparatus determines whether the flag informing the trouble of the communication state is set.

When the CPU 507 determines that the flag informing the trouble of the communication state is set, the information for extending the UI of the image forming apparatus cannot be acquired from the management server 106.

Therefore, the image forming apparatus displays the UI screen in a state where the extension button cannot be pressed down on the UI of the image forming apparatus. By restricting the display as described above, it can be informed to the user that the button is not temporarily available. Thus, the user does not have to wait during the timeout of the network.

In the normal transmission of the counter information or the event information, when the CPU 507 detects that the network which has been in trouble with the communication has recovered and can have the normal communication, the display is controlled as described below.

More specifically, the flag informing that the communication is in trouble is removed from the flag monitoring the communication state of the image forming apparatus. When the normal UI screen is displayed, the extension button is controlled to be displayed and pressed down by the user.

According to the present exemplary embodiment, when the user using the image forming apparatus cannot acquire the information of the management server 106, the image forming apparatus can previously inform the user that the extension button cannot be used.

Some image forming apparatuses only include a liquid crystal display (LCD) screen which is insufficient for displaying the information, for example the information illustrated in FIGS. 15 and 16. For example, some general laser printers only include the LCD which can display only two digits for displaying the status information.

When the information about the management server is acquired, such a type of screen may have difficulties displaying the status information about the management server.

In order to address the problem described above, the image forming apparatus transmits the function thereof to the management server 106 and determines in what type of a format the maintenance information is to be transmitted from the management server 106 to the image forming apparatus when requesting the setting information. The sequence in that case will be described with reference to FIGS. 8 and 9.

In step S808 illustrated in FIG. 8, the management server 106 receives from the image forming apparatus the request for the setting information, and the display monitor information and the function information of the image forming apparatus 100 illustrated in FIG. 18 at the same time.

FIG. 18 illustrates an example of transmission information received from the image forming apparatus illustrated in FIG. 1 according to the second exemplary embodiment of the present invention. The example describes a type of the image forming apparatus including the LCD which can display two digits only.

The management server 106 receives the transmission information together with the setting information request received from the image forming apparatus 100 in step S808 illustrated in FIGS. 8 and 9. An example will be described in which the transmission information includes the display monitor information and the function information.

According to the present exemplary embodiment, size information about the monitor, and display monitor information informing what type (hyper text markup language (HTML) or portable document format (PDF)) of a data format can be provided to the user using the image forming apparatus are transmitted to the management server 106.

The management server 106 compares the previously-generated UI button information to the received display monitor information or function information to generate the appropriate UI button and transmits the information to the image forming apparatus 100.

For example, the image forming apparatus may include the display monitor which can display only a two-digit letter string. However, if the image forming apparatus has a PDF output function, the menu can be extended. Thus, when the user selects the function, the information can be output from the printer unit 514 using the PDF received from the management server 106.

When the communication test from the image forming apparatus 100 to the management server 106 is conducted before the image forming apparatus 100 is registered with the management server 106, the management server 106 operates as described below.

In step S808 illustrated in FIG. 9, the management server 106 receives from the image forming apparatus the request for the setting information, and the display monitor information and the function information about the image forming apparatus 100 illustrated in FIG. 18 at the same time. Responding to step S808, the service list information of the management server 106 corresponding to the display monitor information and the function information is transmitted to the image forming apparatus 100.

In step S852 illustrated in FIG. 9, the image forming apparatus 100 displays the service information selected by the service man as the list illustrating which button is extended on which UI. At this time, when the image forming apparatus does not include an effective monitor, the service list is printed by the printer unit 514, and the service number is input via the two-digit LCD to select the service.

With this operation, even when the image forming apparatus 100 does not have the LCD sufficient for displaying the information for extending the button on the UI screen of the image forming apparatus, the UI of the image forming apparatus can be extended and the information managed by the management server 106 can be provided to the user of the image forming apparatus.

More specifically, even when the image forming apparatus 100 does not include the display device sufficient for displaying the information, the management server 106 can provide the appropriate service using the printing function of the image forming apparatus 100 according to the display device of the image forming apparatus and the function of the display device.

The present invention can also be realized by executing the following process. That is, a process in which a software (program) that realizes the functions of the above-described embodiments is supplied to the system or apparatus via a network or a recording medium of various types, and then a computer of the system or apparatus (or devices such as CPU or MPU) reads out the program and performs it. In such a case, the recording medium where the program is stored as well as the program are included in the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-261336 filed Oct. 8, 2008, which is hereby incorporated by reference herein in its entirety.

What is claimed is:

1. A management apparatus which manages a plurality of image forming apparatus via a network comprising:
   at least one processor, the at least one processor executing a program so as to control one or more of:
   a setting unit configured to, when information about the image forming apparatus to be monitored is registered with a database, set a service function to be provided to the image forming apparatus;
   a management unit configured to manage a table associating the set service function with access-destination information for acquiring information corresponding to the set service function, the access-destination information differing by an operation mode between a user mode and a service mode set in the image forming apparatus;
   a generation unit configured to generate, based on the managed table, the access-destination information for acquiring information corresponding to the service function set by the setting unit and button information for selecting the service function, depending on whether the operation mode acquired from the image forming apparatus is determined as the user mode or as the service mode; and
   a response unit configured to, when the information about the image forming apparatus is registered with the database as an object to be managed, respond with the access-destination information and the button information that are generated by the generation unit to the image forming apparatus in response to a request from the image forming apparatus.

2. The management apparatus according to claim 1, the at least one processor executing a program so as to further control a transmission unit configured to, when communication by a communication test is received from an image forming apparatus which is not registered with the database, transmit to the image forming apparatus a list of the service functions to be provided to the image forming apparatus,
   wherein, as information about the image forming apparatus, the service function selected by the image forming apparatus from the service function list transmitted by the transmission unit is registered with the database.

3. The management apparatus according to claim 1,
   wherein the service functions include a service function for acquiring counter history information about the image forming apparatus, a service function for acquiring event history information, a service function for acquiring stock information about consumable products, and a service function for acquiring replacement history information about a replaceable part of the image forming apparatus.

4. An image forming apparatus which communicates via a network with a management apparatus that manages information about the image forming apparatus to be registered, the image forming apparatus comprising:
   at least one processor, the at least one processor executing a program so as to control one or more of:
   a reception unit configured to receive from the management apparatus button information for selecting a service function registered with the image forming apparatus and access-destination information for acquiring information corresponding to the service function to be acquired by pressing down a button displayed based on the button information, wherein the access-destination information differs by an operation mode between a user mode and a service mode set in the image forming apparatus; and
   a display control unit configured to extend and display the button for selecting the service function on a user interface based on the button information received by the reception unit,
   wherein the image forming apparatus accesses a different access destination according to the access-destination information depending on whether the operation mode set in the image forming apparatus is determined as the user mode or the service mode, in a case where the button information is selected.

5. The image forming apparatus according to claim 4, the at least one processor executing a program so as to further control an acquirement unit configured to, when the button extended and displayed by the display control unit is selected on the user interface, acquire service information according to the access-destination information corresponding to the selected button.

6. The image forming apparatus according to claim 4, the at least one processer executing a program so as to further control a communication unit configured to conduct a communication test between the management apparatus and the image forming apparatus, wherein, when the communication unit conducts the communication test, the reception unit receives from the management apparatus a list of service functions which the image forming apparatus can deal with.

7. A service processing method performed by a management apparatus which manages a plurality of image forming apparatus via a network comprising:

when information about the image forming apparatus to be monitored is registered with a database, setting a service function to be provided to the image forming apparatus;

managing a table associating the set service function with access-destination information for acquiring information corresponding to the set service function, the access-destination information differing by an operation mode between a user mode and a service mode set in the image forming apparatus;

generating, based on the managed table, the access-destination information for acquiring information corresponding to the service function set by the setting unit and button information for selecting the service function, depending on whether the operation mode acquired from the image forming apparatus is determined as the user mode or as the service mode; and when the information about the image forming apparatus is registered with the database as an object to be managed, responding with the access-destination information and the button information that are generated by the generation unit to the image forming apparatus in response to a request from the image forming apparatus generating.

8. The service processing method according to claim 7, further comprising, when communication in a communication test is received from an image forming apparatus which is not registered with the database, transmitting to the image forming apparatus a list of the service functions to be provided to the image forming apparatus, wherein, as information about the image forming apparatus, the service function selected by the image forming apparatus from the service function list transmitted by the transmission unit is registered with the database.

9. The service processing method according to claim 7, wherein the service functions include a service function for acquiring counter history information about the image forming apparatus, a service function for acquiring event history information, a service function for acquiring stock information about consumable products, and a service function for acquiring replacement history information about a replaceable part of the image forming apparatus.

10. A service processing method performed by an image forming apparatus which communicates via a network with a management apparatus that manages information about the image forming apparatus to be registered, the service processing method comprising:

receiving from the management apparatus button information for selecting a service function registered with the image forming apparatus and access-destination information for acquiring information corresponding to the service function to be acquired by pressing down a button displayed based on the button information, wherein the access-destination information differs by an operation mode between a user mode and a service mode set in the image forming apparatus; and extending, displaying and controlling the button for selecting the service function on a user interface based on the received button information, wherein the image forming apparatus accesses a different access destination according to the access-destination information depending on whether the operation mode set in the image forming apparatus is determined as the user mode or the service mode, in a case where the button information is selected.

11. The service processing method according to claim 10, further comprising, when the extended and displayed button is selected on the user interface, acquiring service information according to the access-destination information corresponding to the selected button.

12. The service processing method according to claim 10, further comprising conducting a communication test between the management apparatus and the image forming apparatus, wherein, when the communication test is conducted, a list of service functions which can be dealt with by the image forming apparatus is received from the management apparatus.

13. A non-transitory computer readable storage medium on which is stored a computer program for making a computer execute a method for managing a plurality of image forming apparatus via a network, the method comprising:

when information about the image forming apparatus to be monitored is registered with a database, setting a service function to be provided to the image forming apparatus;

managing a table associating the set service function with access-destination information for acquiring information corresponding to the set service function, the access-destination information differing by an operation mode between a user mode and a service mode set in the image forming apparatus;

generating, based on the managed table, the access-destination information for acquiring information corresponding to the service function set by the setting unit and button information for selecting the service function, depending on whether the operation mode acquired from the image forming apparatus is determined as the user mode or as the service mode; and when the information about the image forming apparatus is registered with the database as an object to be managed, responding with the generated access-destination information and the generated button information to the image forming apparatus in response to a request from the image forming apparatus generating.

14. A non-transitory computer readable storage medium on which is stored a computer program for making a computer execute a method for controlling an image forming apparatus which communicates with a management apparatus via a network, wherein the management apparatus manages registered information of a plurality of image forming apparatus, the method comprising:

receiving from the management apparatus button information for selecting a service function registered with the image forming apparatus and access-destination information for acquiring information corresponding to the service function to be acquired by pressing down a button displayed based on the button information, wherein the access-destination information differs by an operation mode between a user mode and a service mode set in the image forming apparatus; and extending, displaying and controlling the button for selecting the service function on a user interface based on the received button information, wherein the image forming apparatus accesses a different access destination according to the access-destination information depending on whether the operation mode set in the image forming apparatus is determined as the user mode or the service mode, in a case where the button information is selected.

* * * * *